US009672560B2

(12) United States Patent
Malapati et al.

(10) Patent No.: US 9,672,560 B2
(45) Date of Patent: Jun. 6, 2017

(54) DISTRIBUTED ORDER ORCHESTRATION SYSTEM THAT TRANSFORMS SALES PRODUCTS TO FULFILLMENT PRODUCTS

(75) Inventors: Venkatesh Malapati, Frisco, TX (US); Sumeet Rijhsinghani, Fremont, CA (US); Sunita Datti, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 443 days.

(21) Appl. No.: 13/535,836

(22) Filed: Jun. 28, 2012

(65) Prior Publication Data
US 2014/0006216 A1    Jan. 2, 2014

(51) Int. Cl.
G06Q 30/06    (2012.01)
G06Q 30/08    (2012.01)

(52) U.S. Cl.
CPC ................ G06Q 30/0635 (2013.01)

(58) Field of Classification Search
CPC ................ G06Q 30/06; G06Q 30/08
USPC .................................. 705/26.1, 27.1
See application file for complete search history.

(56) References Cited

U.S. PATENT DOCUMENTS

| | | | |
|---|---|---|---|
| 4,044,337 A | 8/1977 | Hicks et al. | |
| 4,855,190 A | 8/1989 | Bezner | |
| 5,201,010 A | 4/1993 | Deaton et al. | |
| 5,440,726 A | 8/1995 | Fuchs et al. | |
| 5,630,047 A | 5/1997 | Wang | |
| 5,761,499 A | 6/1998 | Sonderegger | |
| 5,768,586 A | 6/1998 | Zweben et al. | |
| 5,987,423 A | 11/1999 | Arnold et al. | |
| 5,996,088 A | 11/1999 | Frank et al. | |
| 6,052,679 A | 4/2000 | Aparicio et al. | |
| 6,053,948 A | 4/2000 | Vaidyanathan et al. | |
| 6,055,573 A | 4/2000 | Gardenswartz et al. | |
| 6,341,287 B1 | 1/2002 | Sziklai et al. | |
| 6,374,264 B1 | 4/2002 | Bohannon et al. | |
| 6,539,386 B1 | 3/2003 | Athavale et al. | |
| 6,560,592 B1 | 5/2003 | Reid et al. | |
| 6,567,783 B1 | 5/2003 | Notani et al. | |

(Continued)

OTHER PUBLICATIONS

Bidwell, Percy W, Imports in the American Economy, Foreign Affairs (pre-1986); Oct. 1945; 24, 000001; ProQuest Central, pp. 85-98, total 14 pages.*

(Continued)

*Primary Examiner* — James Zurita
(74) *Attorney, Agent, or Firm* — Miles & Stockbridge P.C.

(57) ABSTRACT

A distributed order orchestration system provides a plurality of representations of a product, such as a sales-centric representation of a product and a fulfillment-centric representation of a product. The distributed order orchestration system captures an order associated with the product, and creates a sales order based on the sales-centric representation of the product. The distributed order orchestration system then transform the sales order into a fulfillment order, where the fulfillment order is based on the fulfillment-centric representation of the product. As part of the transformation, product information that is associated with the sales order is transformed into product information that is associated with the fulfillment order, using one or more product transformation rules.

15 Claims, 12 Drawing Sheets

(56) References Cited

U.S. PATENT DOCUMENTS

| | | |
|---|---|---|
| 6,601,233 B1 | 7/2003 | Underwood |
| 6,678,882 B1 | 1/2004 | Hurley et al. |
| 6,698,018 B1 | 2/2004 | Zimniewicz et al. |
| 6,876,977 B1 | 4/2005 | Marks |
| 6,915,294 B1 | 7/2005 | Singh et al. |
| 6,934,687 B1 | 8/2005 | Papierniak et al. |
| 7,003,476 B1 | 2/2006 | Samra et al. |
| 7,031,787 B2 | 4/2006 | Kalthoff et al. |
| 7,096,189 B1 | 8/2006 | Srinivasan |
| 7,107,340 B2 | 9/2006 | Chkodrov et al. |
| 7,139,841 B1 | 11/2006 | Somasundaram et al. |
| 7,356,482 B2 | 4/2008 | Frankland et al. |
| 7,379,903 B2 | 5/2008 | Caballero et al. |
| 7,403,904 B2 | 7/2008 | Abe et al. |
| 7,412,399 B1 | 8/2008 | Racca |
| 7,441,187 B2 | 10/2008 | Meadows |
| 7,467,375 B2 | 12/2008 | Tondreau et al. |
| 7,469,219 B2 | 12/2008 | Goldberg |
| 7,472,374 B1 | 12/2008 | Dillman et al. |
| 7,546,257 B2 | 6/2009 | Hoffman et al. |
| 7,567,975 B2 | 7/2009 | Yalamanchi |
| 7,574,483 B1 | 8/2009 | Alger et al. |
| 7,590,680 B2 | 9/2009 | Fernando et al. |
| 7,627,867 B2 | 12/2009 | Banks |
| 7,657,534 B2 | 2/2010 | Kirkgaard |
| 7,664,750 B2 | 2/2010 | Frees et al. |
| 7,680,752 B1 | 3/2010 | Clune, III et al. |
| 7,680,782 B2 | 3/2010 | Chen et al. |
| 7,707,200 B2 | 4/2010 | Jain et al. |
| 7,797,598 B1 | 9/2010 | Secatch |
| 7,873,611 B2 | 1/2011 | Ebersole |
| 7,987,163 B2 | 7/2011 | Keshavarz-Nia et al. |
| 8,028,276 B1 | 9/2011 | Bessonov |
| 8,112,317 B1 * | 2/2012 | Ballaro et al. ............... 705/26.1 |
| 8,141,125 B2 | 3/2012 | Maes |
| 8,271,609 B2 | 9/2012 | Addala et al. |
| 8,402,064 B2 | 3/2013 | Addala et al. |
| 8,458,312 B2 | 6/2013 | Raghunathan et al. |
| 8,627,271 B2 | 1/2014 | Reed et al. |
| 2002/0026339 A1 | 2/2002 | Frankland et al. |
| 2002/0042751 A1 | 4/2002 | Sarno |
| 2002/0042755 A1 | 4/2002 | Kumar et al. |
| 2002/0178014 A1 | 11/2002 | Alexander |
| 2002/0178074 A1 | 11/2002 | Bloom |
| 2003/0078933 A1 | 4/2003 | Gara et al. |
| 2003/0078944 A1 | 4/2003 | Yamauchi et al. |
| 2003/0144852 A1 | 7/2003 | Eckert et al. |
| 2003/0172007 A1 | 9/2003 | Helmolt et al. |
| 2003/0182145 A1 | 9/2003 | Kalthoff et al. |
| 2004/0024784 A1 | 2/2004 | Spall et al. |
| 2004/0064351 A1 | 4/2004 | Mikurak |
| 2004/0068526 A1 | 4/2004 | Singh |
| 2004/0088196 A1 | 5/2004 | Childress et al. |
| 2004/0111336 A1 | 6/2004 | Argust et al. |
| 2004/0139176 A1 | 7/2004 | Farrell et al. |
| 2004/0181425 A1 | 9/2004 | Schwerin-Wenzel et al. |
| 2004/0181771 A1 | 9/2004 | Anonsen et al. |
| 2004/0181775 A1 | 9/2004 | Anonsen et al. |
| 2004/0215526 A1 | 10/2004 | Luo et al. |
| 2004/0236607 A1 | 11/2004 | Kost et al. |
| 2004/0243485 A1 | 12/2004 | Borenstein et al. |
| 2004/0267689 A1 | 12/2004 | Gavlak et al. |
| 2005/0027732 A1 | 2/2005 | Kalima |
| 2005/0044197 A1 | 2/2005 | Lai |
| 2005/0044530 A1 | 2/2005 | Novik |
| 2005/0075941 A1 | 4/2005 | Jetter et al. |
| 2005/0096959 A1 | 5/2005 | Kumar et al. |
| 2005/0102192 A1 | 5/2005 | Gerrits et al. |
| 2005/0113098 A1 | 5/2005 | Cankaya et al. |
| 2005/0182768 A1 | 8/2005 | Waldorf et al. |
| 2005/0216573 A1 | 9/2005 | Gutjahr |
| 2005/0240756 A1 | 10/2005 | Mayer |
| 2005/0289013 A1 | 12/2005 | Goldberg |
| 2006/0026319 A1 | 2/2006 | Rothman et al. |
| 2006/0178918 A1 | 8/2006 | Mikurak |
| 2006/0224613 A1 | 10/2006 | Bermender et al. |
| 2006/0235733 A1 | 10/2006 | Marks |
| 2006/0265272 A1 | 11/2006 | Bosa et al. |
| 2006/0277024 A1 | 12/2006 | Kloppmann et al. |
| 2007/0016429 A1 | 1/2007 | Bournas et al. |
| 2007/0016608 A1 | 1/2007 | Mullins |
| 2007/0088596 A1 | 4/2007 | Berkelhamer et al. |
| 2007/0121850 A1 | 5/2007 | Klos et al. |
| 2007/0192124 A1 | 8/2007 | Anderson et al. |
| 2007/0203803 A1 | 8/2007 | Stone et al. |
| 2007/0233287 A1 | 10/2007 | Sheshagiri et al. |
| 2007/0256050 A1 | 11/2007 | Behnia et al. |
| 2007/0260575 A1 | 11/2007 | Robinson et al. |
| 2007/0288412 A1 | 12/2007 | Linehan |
| 2008/0016471 A1 | 1/2008 | Park |
| 2008/0033700 A1 | 2/2008 | Kano et al. |
| 2008/0040245 A1 | 2/2008 | Wadawadigi et al. |
| 2008/0043639 A1 | 2/2008 | Song |
| 2008/0046868 A1 | 2/2008 | Tsantilis |
| 2008/0071561 A1 | 3/2008 | Holcombe |
| 2008/0098108 A1 | 4/2008 | Yu |
| 2008/0098378 A1 | 4/2008 | Kilbane et al. |
| 2008/0127044 A1 | 5/2008 | Barros |
| 2008/0147517 A1 | 6/2008 | Martinez et al. |
| 2008/0163164 A1 | 7/2008 | Chowdhary et al. |
| 2008/0229307 A1 | 9/2008 | Maeda et al. |
| 2008/0235324 A1 | 9/2008 | Abernethy et al. |
| 2008/0256133 A1 | 10/2008 | Frankland et al. |
| 2008/0281833 A1 | 11/2008 | Cain et al. |
| 2008/0301419 A1 | 12/2008 | Barros et al. |
| 2008/0307255 A1 | 12/2008 | Chen et al. |
| 2008/0320486 A1 | 12/2008 | Bose et al. |
| 2009/0070783 A1 | 3/2009 | Schmidt et al. |
| 2009/0083632 A1 | 3/2009 | Brosh et al. |
| 2009/0089078 A1 | 4/2009 | Bursey |
| 2009/0089776 A1 | 4/2009 | Sonkin et al. |
| 2009/0150887 A1 | 6/2009 | Sanghvi et al. |
| 2009/0171819 A1 | 7/2009 | Von Der Emde et al. |
| 2009/0172689 A1 | 7/2009 | Bobak et al. |
| 2009/0192884 A1 | 7/2009 | Lo |
| 2009/0210268 A1 | 8/2009 | Fan et al. |
| 2009/0216874 A1 | 8/2009 | Thain et al. |
| 2009/0222395 A1 | 9/2009 | Light et al. |
| 2009/0228546 A1 | 9/2009 | Yendluri |
| 2009/0319685 A1 | 12/2009 | Martin |
| 2010/0070331 A1 | 3/2010 | Koegler et al. |
| 2010/0110933 A1 | 5/2010 | Wilcock et al. |
| 2010/0121740 A1 | 5/2010 | Reed et al. |
| 2010/0138017 A1 | 6/2010 | Vrba et al. |
| 2011/0055815 A1 | 3/2011 | Squillace |
| 2011/0125553 A1 | 5/2011 | Mazzoleni et al. |
| 2011/0167105 A1 | 7/2011 | Ramakrishnan et al. |
| 2011/0184969 A1 | 7/2011 | Idicula et al. |

OTHER PUBLICATIONS

Classified ad 4—no title (May 29, 1852. New York Daily Times (1851-1857).*

Martin, Thomas, Ancient Greece: from prehistoric to Hellenistic Times, Yale University, 1996. pp. 11-12, total 2 pages.*

Xiaoyu Zhang and Denis Gračanin, "Service-Oriented-Architecture based Framework for Multi-User Virtual Environments", Proceedings of the 2008 Winter Simulation Conference, pp. 1-9.

Oracle®, "Oracle Fusion Middleware Developer's Guide for Oracle SOA Suite", 11g Release 1 (Jan. 1, 2011) Part No. E10224-01, Chapter 31, pp. 1-25, http://download.oracle.com/docs/cd/E12839_01/integration.1111/e10224/bam_data_objects.htm.

Oracle®, "Oracle Fusion Middleware Fusion Developer's Guide for Oracle Application Development Framework", 11g Release 1 (Jan. 1, 2011) Part No. B31974-03, Chapter 41, pp. 1-6, http://download.oracle.com/docs/cd/E12839_01/web.1111/b31974/adv_ads.htm.

Sterling Commerce, "Sterling Distributed Order Mangement", pp. 1-2.

Oracle®, "Oracle it Service Management Suite Overview", pp. 1-3, http://www.oracle.com/technetwork/oem/grid-control/overview/twp-oracle-it-serv-mgmt-feature-ove-133400.pdf.

(56) References Cited

OTHER PUBLICATIONS

Oracle Data Sheet, "Oracle Order Management", Copyright 2009 Oracle; pp. 1-5.
Raju Addala, et al., U.S. Appl. No. 12/718,468, filed Mar. 5, 2010.
Raju Addala, et al., U.S. Appl. No. 12/718,647, filed Mar. 5, 2010.
Raju Addala, et al., U.S. Appl. No. 12/697,756, filed Feb. 1, 2010.
Raju Addala, et al., U.S. Appl. No. 12/718,501, filed Mar. 5, 2010.
Raju Addala, et al., U.S. Appl. No. 12/718,536, filed Mar. 5, 2010.
Raju Addala, et al., U.S. Appl. No. 12/718,625, filed Mar. 5, 2010.
Raju Addala, et al., U.S. Appl. No. 12/718,520, filed Mar. 5, 2010.
Raju Addala, et al., U.S. Appl. No. 12/718,475, filed Mar. 5, 2010.
Raju Addala, et al., U.S. Appl. No. 12/718,585, filed Mar. 5, 2010.
Raju Addala, et al., U.S. Appl. No. 12/718,383, filed Mar. 5, 2010.
Raju Addala, et al., U.S. Appl. No. 12/718,569, filed Mar. 5, 2010.
Gregor Hohpe and Bobby Woolf, "Enterprise Integration Patterns; Publish-Subscribe Channel", http://www.eaipatterns.com/PublishSubscribeChannel.html.
Gregor Hohpe and Bobby Woolf, "Enterprise Integration Patterns; Point-to-Point Channel", http://www.eaipatterns.com/PointToPointChannel.html.
Gregor Hohpe and Bobby Woolf, Enterprise Integration Patterns; Chapter 3, pp. 57-97, http://www.eaipatterns.com/docs/EnterpriseIntegrationPatterns_HohpeWoolf_ch03.pdf.
Gregor Hohpe, "Programming Without a Call Stack—Event-driven Architectures", pp. 1-10, http://www.eaipatterns.com/docs/EDA.pdf.
"Oracle Communications Order and Service Management™ Version 6.3", Administration Guide, First Edition, Sep. 2007.
Raju Addala, et al., U.S. Appl. No. 12/945,084, filed Nov. 12, 2010.
Fred Mahakian, et al., U.S. Appl. No. 12/900,816, filed Oct. 8, 2010.
Fred Mahakian, et al., U.S. Appl. No. 13/359,611, filed Jan. 27, 2012.
Sarita Sridharan, et al., U.S. Appl. No. 13/477,591, filed May 22, 2012.
"Orchestrating Web Services: The Case for a BPEL Server", by Dave Shaffer and Brian Dayton, An Oracle White Paper, Jun. 2004, Oracle Corporation.
Stephen McIlvenna et al., "Synthesis of Orchestrators from Service Choreographies", Faculty of Science and Technology, Institute of Computer Science, University of Tartu, Estonia, 2009.
Lienhard et al, Workflow and Business Rules: a Common Approach, BPTrends, Sep. 2005, ivyTeam—SORECOGroup, Switzerland.
ConceptWave Software Inc., "Order Management", Jul. 26, 2004.
Joan Lawson et al., "Orchestrating into End-to-End Processes", Oracle International Corporation, Mastering SOA, Part 3, Feb. 2007.
Bimal Mehta et al., "BizTalk Server 2000 Business Process Orchestration", Microsoft Corporation, 2001, Bulletin of the EEE Computer Society Technical Committee on Data Engineering, 2001.
BizTalk Orchestration: A Technology for Orchestrating Business Interactions White Paper, Microsoft Corporation, Jun. 5, 2000.
Gael Blondelle et al., "How to Choose Your Process Orchestration Technology", EBM Websourcing, Petals link, Version 1.0, Dec. 2009.
Nuno F. Rodrigues et al., "On the Discovery of Business Processes Orchestration Patterns", University of do Minho, Portugal, 2004.
J. Wolfgang et al.; "Value-Based Differentiation in Business Relationships: Gaining and Sustaining Key Supplier Status"; Journal of Marketing; vol. 70; Jan. 2006; pp. 119-136.
Order Orchestration and Management with Tapestry, CGI Group Inc., 2009.
Carlo Blundo et al., "Validating Orchestration of Web Services with BPEL and Aggregate Signatures", Sixth European Conference on Web Services, 2008 IEEE Computer Society.
Final Office Action mailed on Jul. 26, 2016 for U.S. Appl. No. 12/718,536.
Advisory Action mailed Nov. 1, 2016 for U.S. Appl. No. 12/718,536.
Non-Final Office Action mailed Nov. 29, 2016 for U.S. Appl. No. 12/718,501.

* cited by examiner

DISTRIBUTED ORDER ORCHESTRATION SYSTEM THAT TRANSFORMS SALES PRODUCTS TO FULFILLMENT PRODUCTS

FIELD

One embodiment is directed to a computer system generally, and more particularly to a computer system for managing an orchestration of business processes.

BACKGROUND

Order management systems are computer software and/or hardware systems implemented by a number of industries to facilitate order entry and processing. Companies, such as catalog companies and those utilizing electronic commerce, use order management systems to receive, process and fulfill customer orders. An order management system makes possible the entering of an order via a website shopping cart or data entry system. The system typically captures customer-related information and/or account level information for each order. Credit verification or payment processing may then be performed to check for available funds and validate the transaction. Valid orders are processed for warehouse fulfillment, including picking, packing and shipping of the ordered goods or services.

In general, most order management system are designed to have a single representation of a product end-to-end in an order lifecycle, which results in a sales-centric view of the product, and results in a fulfillment-centric view of the product being the same on the order. This results in many of the product details that are required for the purpose of fulfillment also being present on the sales order. When an order is entered in an order capture system, the fulfillment-related product details are also included on the order, which results in the order capture system being required to deal with fulfillment-centric complexity.

SUMMARY

One embodiment is directed to a distributed order orchestration system that receives a sales order, where the sales order includes a first representation of a product, and where the sales order is an order received from an order capture system and is in a format used by the order capture system. The distributed order orchestration system further evaluates one or more product transformation rules. The distributed order orchestration system further transforms the first representation of the product into a second representation of the product based on the one or more product transformation rules. The distributed order orchestration system further transforms the sales order into the fulfillment order, where the fulfillment order is in a format used by the distributed order orchestration system. The distributed order orchestration system further stores the second representation of the product within the fulfillment order.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is directed to a distributed order orchestration system that provides a plurality of representations of a product, such as a sales-centric representation of a product and a fulfillment-centric representation of a product. An order capture system can therefore, capture an order associated with the product, and create a sales order based on the sales-centric representation of the product. The distributed order orchestration system can then transform the sales order into a fulfillment order, where the fulfillment order is based on the fulfillment-centric representation of the product. As part of the transformation, product information that is associated with the sales order can be transformed into product information that is associated with the fulfillment order, using one or more product transformation rules, and using one or more types of product transformation rules.

Distributed Order Orchestration Framework

One embodiment is directed to a distributed order orchestration system ("DOO"). Distributed order orchestration provides a flexible, configurable infrastructure that can be easily customized to be consistent with an enterprise's business practices and existing order fulfillment system architecture. Decomposition is the conversion of data received from one or more order capture modules into an internal canonical format in order to process the data.

Figure 1:
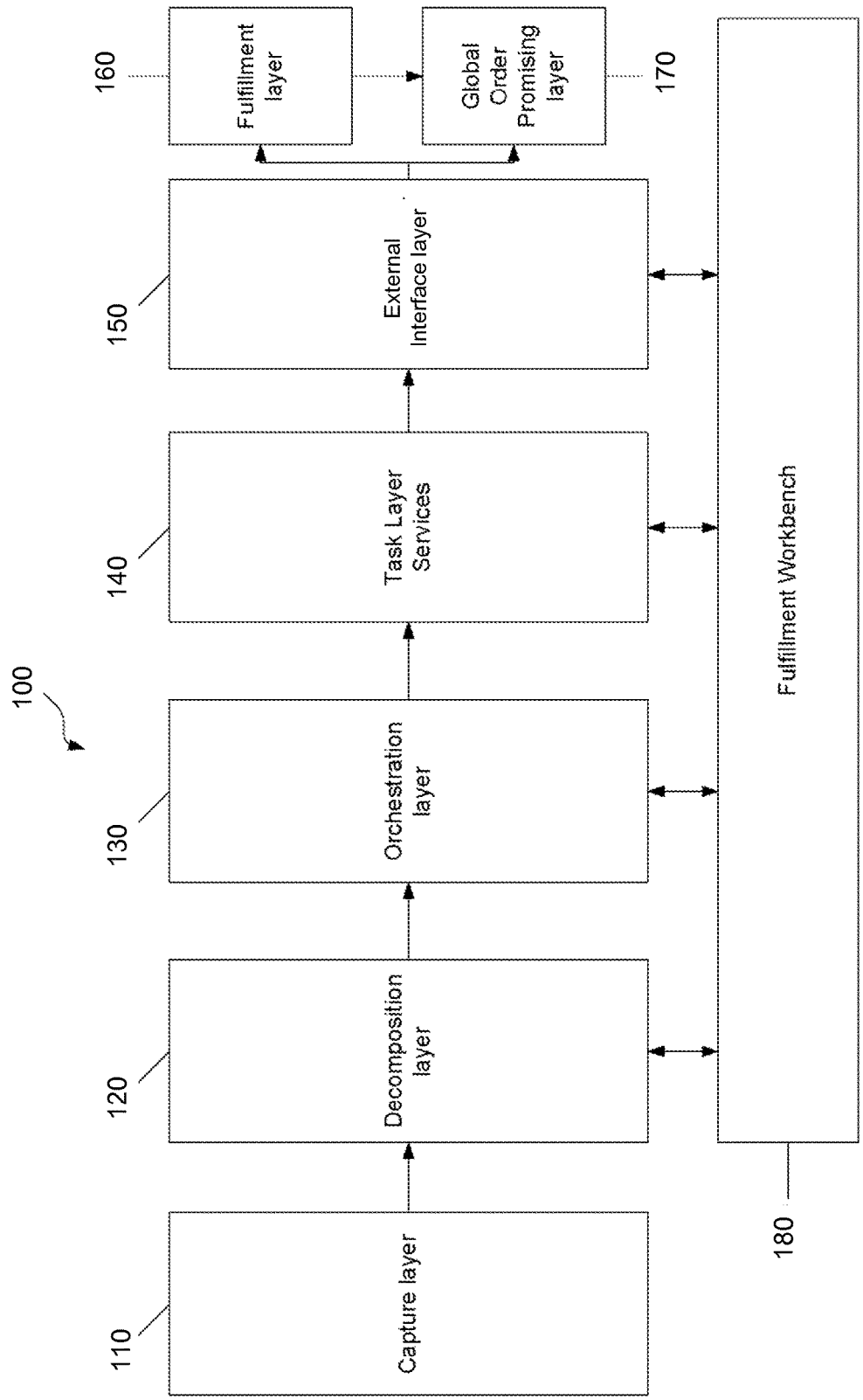
FIG. 1 illustrates an example of a distributed order orchestration system according to one embodiment.

FIG. 1 illustrates an example of a distributed order orchestration system 100 according to one embodiment. In the embodiment, distributed order orchestration system 100 includes a capture layer 110 that can receive and capture information related to customer orders for goods and/or services across multiple channels. The order may be captured via a graphical user interface, such as that of a website shopping cart, or can be received via any data entry system. Capture layer 110 captures and forwards the order information to a decomposition layer 120 through a connector. However, in an alternative embodiment, capture layer 110 is separate from distributed order orchestration system 100. In this alternative embodiment, a connector service is utilized as a bridge between distributed order orchestration system 100 and capture layer 110.

Order capture systems capture the order with any necessary functional attributes that are needed to process the order, such as pricing, validation, eligibility, etc. The sales order is fed to decomposition layer 120 in the form of a source order. The source order is generated from a sales order submitted by different capture systems. The source order is in a generic format that is fed into decomposition layer 120.

Decomposition layer 120 receives the order information and breaks the received order into individual fulfillment requests to be sent to fulfillment systems and supply-side partners for execution. Decomposition layer 120 may include a decomposition rules workbench for setting up rules, rule sets, and transformation processes. Order capture layer 110, which captures the order from a sales perspective, can submit the order to decomposition layer 120 through a decomposition service. For example, a laptop computer may be sold worldwide. The laptop includes a power cord, but the customer just buys a laptop (one line on the order). For example, it may be easier for the sales website to just sell or offer the laptop and not have the customer individually select the power cord separately. However, from a fulfillment perspective, the laptop and the power cord are needed in order to fulfill the order. In decomposition layer 120, there may be a business rule that says that a laptop must have a power cord and the specification of the power cord must match the country to which the laptop is shipped. Therefore, when decomposition layer 120 is complete, the order will have two lines, one with the laptop and one for the appropriate power cord. Thus, the order has been decomposed into multiple items that need to be fulfilled.

Also, decomposition layer 120 may take the received order and translate it to the order format and order content required by the other layers of distributed order orchestration system 100, such as fulfillment layer 160 in one embodiment. Because capture layer 110 is capable of receiving orders in any format for compatibility purposes across different types of systems, decomposition layer 120 may need to translate the order into a format that is compatible with and can be recognized by all the other layers and/or processes of distributed order orchestration system 100. Additionally, decomposition layer 120 may provide a process launch capability to assign and launch orchestration processes for an order based on appropriate decomposition rules. For example, different orchestration processes are assigned based on parameters in the order. A company may give special treatment to certain customers in terms of speed of fulfillment or shipping. For example, "Gold" customers may be offered expedited shipping. Also, there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Enterprise Business Objects ("EBO's"), in one embodiment, that are based on the canonical data model. This approach allows the DOO to be agnostic of participating applications and be independent of source or target applications. The model eliminates the need to map data from different applications directly to each other.

Distributed order orchestration system 100, as illustrated in FIG. 1, further includes an orchestration layer 130. Orchestration layer 130 provides individual orchestration processes to manage good and/or service line items. For example, orchestration layer 130 may provide business process management functionality to support planning of steps within a process, including step duration and calculation or recalculation of completion dates. Orchestration layer 130 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 130 may also provide for jeopardy management in order to check a promised delivery date of an order against current estimated date for completion, map to user defined thresholds, and handle or escalate conditions. Orchestration layer 130 may further provide a process for change orders, including a support process rollback to accommodate for change order automation and modify in-flight orchestration processes for orders changed in order capture stage. Further, a projected order completion date may be provided by instantiating the orchestration process. Orchestration layer 130 also provides a mechanism for updating an order status automatically or upon user request.

One embodiment provides a tool that provides a high degree of abstraction for business process modeling in an order fulfillment business process. Business processes may be modeled by users, such as business analysts, and do not need any coding from an information technology ("IT") designer to have the business process executed. Users are provided the flexibility to define business processes in a central place configured to enter and capture all information required for orchestration and fulfilling an order. An example of such a central place can be a web-based administration user interface. Likewise, an example of all information required for orchestration and order fulfillment may be information required for process planning, core orchestration, and change management. The business process may identify one or more services that define steps to be performed in the order fulfillment process. A run-time engine then uses the definition to dynamically invoke the services based on the definition of the business process.

In the business environment, business users are often process modelers, not IT personnel. By providing a web-based administration environment, the business users may be able to design the business process. The process definitions may be defined in business terms and not in IT terms. Particular embodiments provide an administrative environment outside of a code editor, such as a Business Process Execution Language ("BPEL") editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process (also identified as an "orchestration process"), which is assembled and executed at run-time. In one embodiment, "runtime" can be defined as the time when an order is received for processing. Metadata is assembled in a data runtime table and used to define the executable process for the business process. The metadata is used to invoke services in the executable process.

In one embodiment, the services invoked are encapsulated and reusable. The metadata is used to determine how and when to invoke services. Also, depending on the metadata, input arguments are generated and sent to the services to invoke the encapsulated service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be recoded and redeployed. Deployment of services indicates the process is ready to be released for testing or production.

Distributed order orchestration system 100 may further include a task layer services 140 to provide encapsulated services used to control processing logic for each orchestration process stage. In particular, task layer services 140 may provide task-specific business logic to wrap logic around a certain request such that system 100 knows what logical tasks are associated with a particular request. The steps that need to be performed in the executable process from orchestration may require tasks to be performed. For example, task layer services 140 can provide and control processing logic for scheduling a shipment, requesting a shipment, updating an install base, creating an activity, etc. The output of task layer services 140 is a standard goods and/or service request(s) which may be provided to other layers of system 100, such as external interface layer 150 or fulfillment layer 160. In addition, task layer services 140 may receive input that can be used to update the processing logic or status.

Task layer services 140 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 150. Task layer services 140 transforms and sends the message to the external system layer.

Distributed order orchestration system 100 also includes an external interface layer 150 to translate standard request(s) and route the request(s) to external systems for processing. More specifically, external interface layer 150 may receive the standard goods and/or services request(s) output by task layer services 140 and provide a single layer transform of the request(s) if needed to match the format of fulfillment systems. The transformation performed by external interface layer 150 maps the data to the content and format required by the integrated fulfillment systems. Transformation by decomposition layer 120 converts the data to the internal format used by system 100. External interface layer 150 may map the data structure from task layer services 140 to the external format. External interface layer 150 provides flexible routing so that request(s) are routed to specific fulfillment systems based on business rules. For example, if more than one shipping system is available for fulfillment, business rules will determine to which shipping system an individual shipping request will be sent. External interface layer 150 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 150.

Distributed order orchestration system 100 may further include a global order promising layer 170 that provides an interface, such as a graphical user interface, for scheduling and sourcing orders. In particular, in one embodiment, global order promising layer 170 includes a sourcing broker that determines the best source for products and services associated with the order based upon a customer profile, order and supplier definitions, etc. Also, global order promising layer 170 provides for real-time reserve and un-reserve of inventory and inventory check across distributed internal systems. The interface of global order promising layer 170 allows for the viewing of availability and sourcing information so that a user can view the availability of and manually change the source from which an order for a good or service is being fulfilled. However, in an alternative embodiment, global order promising layer 170 is separate from distributed order orchestration system 100. In this alternative embodiment, a connector service is utilized as a bridge between distributed order orchestration system 100 and global order promising layer 170.

A fulfillment workbench 180 may also be provided as a user interface for order fulfillment administrators, users and supervisors to monitor and manage the flow of orders through the system 100. In an embodiment, fulfillment workbench 180 provides users, such as supervisors, with a mechanism to monitor order fulfillment tasks, including allowing supervisors to monitor activity load and to produce reports. Fulfillment workbench 180 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within fulfillment workbench 180 to provide reports and dashboards to enable order managers to view orders for each system and analyze performance. The fulfillment workbench may make use of graphical representations (e.g., graphs and charts) to clearly convey system status/order information to users. Because DOO system 100 has the data reference data, it is possible to draw aggregated graphs/charts for trending analysis. Users may take actions from the fulfillment workbench as described below, such as by substituting the item ordered, splitting the quantity into multiple order lines, putting a hold on the order lines to prevent further progression, etc.

According to one embodiment, fulfillment workbench 180 allows users to make mass order information changes related to fulfillment including making single line or mass line changes to fulfillment information (e.g., dates, etc.).

Fulfillment workbench 180 may further allow for the monitoring of orchestration processes, such as reviewing the status of orchestration processes including overall process progress, as well as status of individual tasks and corresponding fulfillment lines and people lines. Fulfillment workbench 180, in one embodiment, includes mechanisms for maintaining order fulfillment processing and allows an order processing user to control a process associated with an order including pause, edit, cancel, etc.

In some embodiments, fulfillment workbench 180 also provides functionality for order and task assignment. For example, fulfillment workbench 180 may use an assignment engine to assign orders and activities to the appropriate fulfillment resource. Fulfillment workbench 180 may include a mechanism for batch re-assignment of orders thereby allowing a supervisor to re-source a set of orders from one fulfillment system to another. Fulfillment workbench 180 also provides for the assignment of fill rate and backorder rules that can automatically determine how to handle shortage situations. A universal in-box may be included within fulfillment workbench 180 in order to allow users to view activities assigned to them and respond to the task.

Fulfillment workbench 180 allows a user to view orders being processed in different layers of system 100. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 100 may also include a fulfillment layer 160. In one embodiment, fulfillment layer 160 may be an interface to external fulfillment systems, and can be used to communicate order information and fulfillment requirements to a supplier or source of the goods and/or services associated with an order.

Certain embodiments of distributed order orchestration system 100 include an administration user interface. The administration user interface provides administration services that hide the complexity of the fulfillment execution environment from the end user. For instance, the administration user interface provide product mapping via an administration environment that defines transformations to map product structure between a sales view and a supplier system definition. In this embodiment, sales view refers to a simplified view provided to consumers when placing a sales order. Supplier system definition refers to the more specific and detailed information used by suppliers of goods and/or services. The administration user interface may also provide an orchestration process workbench to set up processes, rule sets, and parameters for order orchestration. The administration user interface has an integrated setup that includes process sequence, planning, jeopardy, change management, and workbench display. The administration user interface also allows for user-defined status transitions for tasks, processes, and fulfillment lines, and business rules configuration for configuring constraints, transformation rules, and routing rules.

Further details of a distributed order orchestration system are described in U.S. patent application Ser. No. 12/617,698, entitled "DISTRIBUTED ORDER ORCHESTRATION," U.S. patent application Ser. No. 12/718,585, entitled "CHANGE MANAGEMENT FRAMEWORK IN DISTRIBUTED ORDER ORCHESTRATION SYSTEM," and U.S. patent application Ser. No. 12/697,756, entitled "ORCHESTRATION OF BUSINESS PROCESSES USING TEMPLATES," the disclosures of which are hereby incorporated by reference.

Transformation of Sales Order to Fulfillment Order

One embodiment is directed to a distributed order orchestration system that provides a plurality of representations of a product, such as a sales-centric representation of a product and a fulfillment-centric representation of a product. An order capture system can, therefore, capture an order associated with the product, and create a sales order based on the sales-centric representation of the product. The distributed order orchestration system can then transform the sales order into a fulfillment order, where the fulfillment order is based on the fulfillment-centric representation of the product. As part of the transformation, a representation of a product that is associated with the sales order can be transformed into a representation of the product that is associated with the fulfillment order, using one or more product transformation rules and/or one or more types of product transformation rules. Such a transformation can include a transformation of the entire product, a transformation of a context of the product, or a transformation of one or more transaction item attributes of the product.

As previously described, most order management systems are designed to have a single representation of a product end-to-end in an order lifecycle, which results in a sales-centric view of the product, and results in a fulfillment-centric view of the product being the same on the order. This results in many of the product details that are required for the purpose of fulfillment also being present on the sales order. When an order is entered in an order capture system, the fulfillment-related product details are also included on the order, which results in the order capture system being required to deal with fulfillment-centric complexity. Thus, current order management systems lack the functionality to handle a demarcation of a sales-centric view of the product details from a fulfillment-centric view of the product details, and this requires the order to include both sets of details.

As described herein, a "sales order" is an order received from an order capture system. When received, the order is in a format that is used by the order capture system. A format of the order that is used by the order capture system is an internal representation of the sales order in that system. A "DOO sales order" is a sales order after it has been transferred into a format that is utilized by the distributed order orchestration system. A "source sales order" or "source order" refers to an original sales order that is received by an order capture system and transformed to an enterprise business object ("EBO"), where an EBO is a generic data structure that supports cross-application business processes, independent of the source or target applications, and which eliminates the need to map data directly from one application to another. A "sales order EBO" is the data structure associated with the sales order. A "sales order enterprise business message" ("EBM") is the actual message exchanged between two participating applications. A "fulfillment order," "orchestration order," or "DOO order" is a sales order that has been transformed into a format that is used by the distributed order orchestration system to orchestrate, and ultimately fulfill, the sales order. An example of a format that is used by the distributed order orchestration system is an arrangement of one or more attributes included within the order, where the arrangement is different from the arrangement associated with an order capture system.

As also described herein, a "product structure" is a structure of a product that defines its composition. A "transformation type" is a type of product transformation rule that defines how an attribute or a product included on a sales order transforms into an attribute or a product included on a fulfillment order. An "attribute" is a detail that further defines the object and specifies the object's behavior. An attribute can represent a characteristic or property of an object, such as a product. A "static item attribute" is an attribute whose value is defined during the definition of the product, and remains immutable throughout the downstream business process. A "transaction item attribute" is an attribute whose value is specified or changed during a downstream business process and/or transaction, as part of the creation or updating of a product occurrence. A "product identity" is an attribute whose value identifies a product. A "business rule" is a rule that controls operation of an executable process based on business logic and runtime data. Finally, a "representation of a product" or "product representation" is a collection of one or more attributes that together can represent a product, and that can be included on either a sales order or a fulfillment order.

According to an embodiment of the invention, a distributed order orchestration system provides a plurality of representations of a product, such as a sales-centric representation of a product and a fulfillment-centric representation of a product. Thus, according to the embodiment, an order capture system of a capture layer of the distributed order orchestration system can utilize a sales-centric representation of a product in processing a sales order. Furthermore, a decomposition module of a decomposition layer of the distributed order orchestration system can transform the sales-centric representation of the product into a fulfillment-centric representation of the product when it transforms the sales order into a fulfillment order. Thus, the one or more fulfillment systems of the fulfillment layer of the distributed order orchestration system can utilize the fulfillment-centric representation of the product when it processes the fulfillment order as part of orchestrating the captured order.

Figure 2:
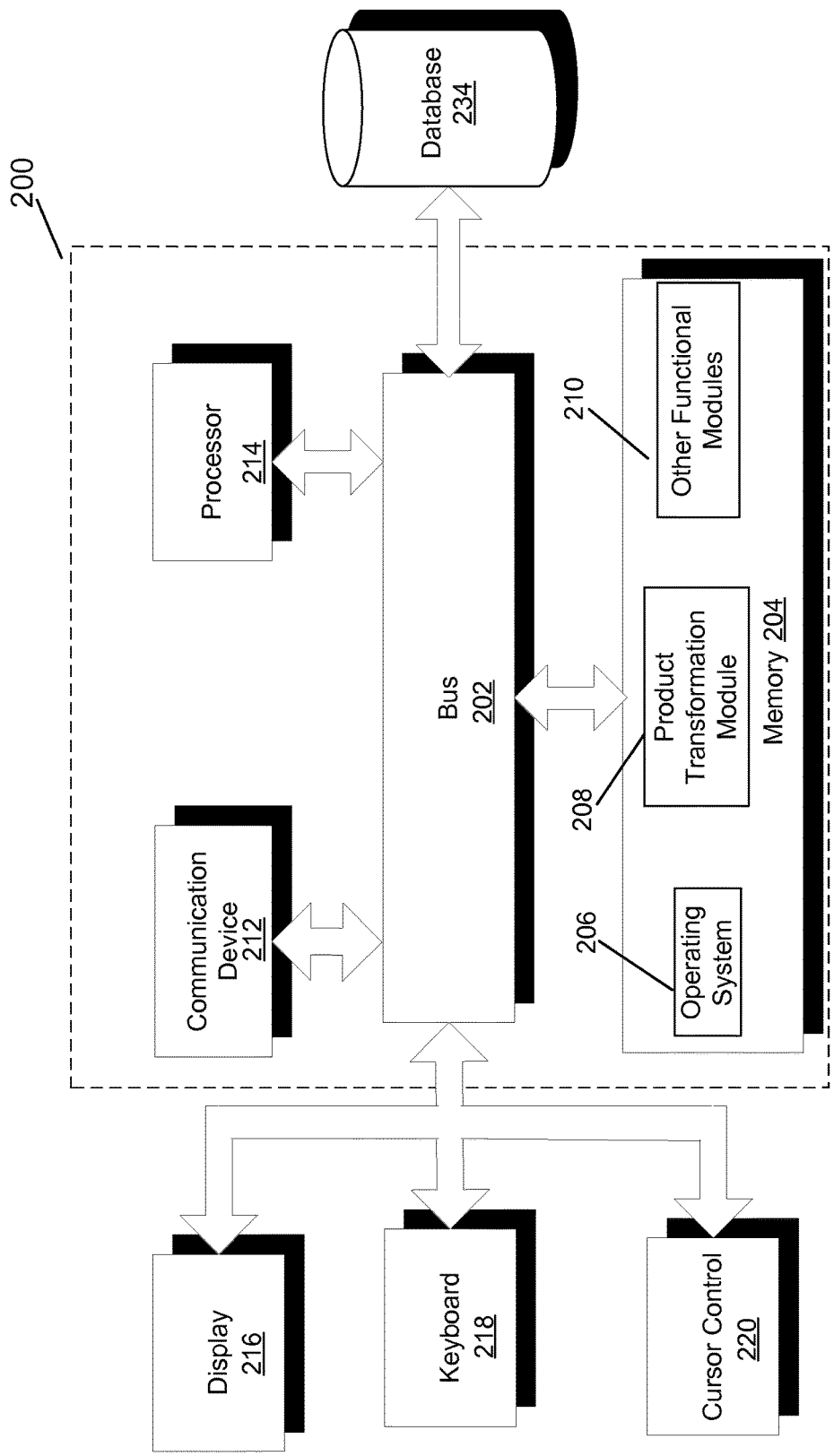
FIG. 2 illustrates a block diagram of a system that may implement an embodiment of the present invention.

FIG. 2 illustrates a block diagram of a system 200 that may implement one embodiment of the invention. System 200 includes a bus 202 or other communications mechanism for communicating information between components of system 200. System 200 also includes a processor 214, operatively coupled to bus 202, for processing information and executing instructions or operations. Processor 214 may be any type of general or specific purpose processor. System 200 further includes a memory 204 for storing information and instructions to be executed by processor 214. Memory 204 can be comprised of any combination of random access memory ("RAM"), read only memory ("ROM"), static storage such as a magnetic or optical disk, or any other type of machine or computer-readable medium. System 200 further includes a communication device 212, such as a network interface card or other communications interface, to provide access to a network. As a result, a user may interface with system 200 directly or remotely through a network or any other method.

A computer-readable medium may be any available medium that can be accessed by processor 214. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 214 can also be operatively coupled via bus 202 to a display 216, such as a Liquid Crystal Display ("LCD"). Display 216 can display information to the user. A keyboard 218 and a cursor control device 220, such as a computer mouse, can also be operatively coupled to bus 202 to enable the user to interface with system 200.

According to one embodiment, memory 204 can store software modules that may provide functionality when executed by processor 214. The modules can include an operating system 206, a product transformation module 208, as well as other functional modules 210. Operating system 206 can provide an operating system functionality for system 200. Product transformation module 208 can provide functionality for transforming a sales order into a fulfillment order, and further, for transforming a representation of a product associated with the sales order into a representation of the product that can be associated with the fulfillment order. In certain embodiments, product transformation module 208 can comprise a plurality of modules that each provide specific individual functionality for transforming a sales order into a fulfillment order, and further, for transforming a representation of a product associated with the sales order into a representation of the product that can be associated with the fulfillment order. System 200 can also be part of a larger system. Thus, system 200 can include one or more additional functional modules 210 to include the additional functionality. For example, functional modules 210 may include modules that are part of the "Fusion" product from Oracle Corporation. An example of a module that is part of the "Fusion" product is a distributed order orchestration module. Functional modules 210 may also include an enterprise resource planning system such as the "E-Business Suite" product from Oracle Corporation.

Processor 214 can also be operatively coupled via bus 202 to a database 234. Database 234 can store data in an integrated collection of logically-related records or files. Database 234 can be an operational database, an analytical database, a data warehouse, a distributed database, an end-user database, an external database, a navigational database, an in-memory database, a document-oriented database, a real-time database, a relational database, an object-oriented database, or any other database known in the art.

According to an embodiment, as previously described, a decomposition module of a decomposition layer is a first module of a distributed order orchestration system to receive an order from an order capture system, and thus, is a gateway for the order capture systems to forward a sales order to the distributed order orchestration system. The decomposition module can transform the sales order into a fulfillment order as part of a decomposition process. During the decomposition process, the decomposition module can perform the transformation based on one or more product transformation rules within the decomposition module. Subsequently, the decomposition module assigns one or more line items to be fulfilled to one or more order orchestration processes, and initiates the one or more order orchestration processes.

Figure 3:
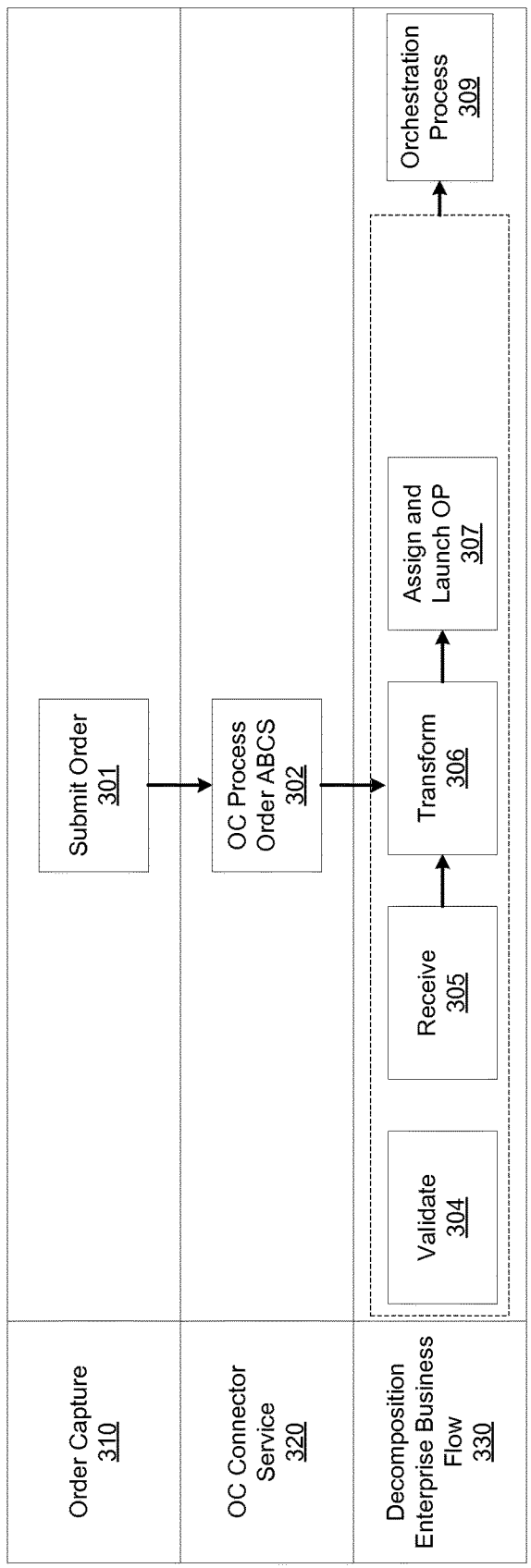
FIG. 3 illustrates a business process task flow for a decomposition process of a distributed order orchestration system, where the decomposition process includes transforming a sales order into a fulfillment order, according to an embodiment of the invention.

FIG. 3 illustrates a business process task flow for a decomposition process of a distributed order orchestration system, where the decomposition process includes transforming a sales order into a fulfillment order, according to an embodiment of the invention. According to the embodiment, the decomposition process involves an order capture layer 310, an order capture connection service layer 320, and an enterprise business flow layer 330.

In order capture layer 310, at 301, a sales order is submitted, and is received by an order capture system. As previously described, information associated with the submitted sales order is captured and forwarded within a sales order object.

In order capture connector service layer 320, at 302, a connector service structurally transfers a structure of the sales order object into a canonical object that the distributed order orchestration system can operate on (i.e., a sales order EBO). The usage of a sales order EBO allows the distributed order orchestration system to be agnostic to one or more order capture systems. The connector service can be implemented in BPEL or any other technology that can be used for an integration layer between an order capture system and the distributed order orchestration system.

The transformation can include a structural transformation, an optional content transformation, and an invocation of a decomposition enterprise business service. A structural transformation includes the structural transformation of the sales order object into a sales order EBO, as previously described. A content transformation includes transformation of business data associated with the sales order object, such as attributes, into business data associated with the sales order EBO, such as attributes. More specifically, the content transformation includes the replacement of order-capture-system-specific identifiers with a common identifier in the event that the order capture system and the distributed order orchestration system operate on different domain values.

According to an embodiment, a product model can be used to transform one or more attributes, as part of the content transformation. More specifically, the distributed order orchestration system can provide a cross-reference service that accepts a context, an attribute, or a list of attributes along with its associated values, and return the cross-reference output attribute or list of attributes along with its associated values. This service can be invoked either from within an Extensible StyleSheet Language Transformation ("XSLT") mapper or through a BPEL process step.

The decomposition process composition can be exposed as a web service definition language ("WSDL"), and which can be invoked as a service from the connector service. The decomposition process can take a sales order EBM as an input to the process. The decomposition process can be invoked by an order capture system through the connector service for different business operations.

In certain embodiments, as previously described, the distributed order orchestration system can use a set of generic data structures (i.e., EBOs) for receiving and storing the sales order. An EBO serves as a common data abstraction across different order capture systems. A connector service is responsible for transforming the sales order from an order capture format into a canonical format. A decomposition service can accept a sales order EBM as input, and return a sales order EBM as output. The sales order EBM includes a header component, a verb component, and an actual business data payload that is required for processing the service operation. The header of the EBM contains information useful for auditing, traceability, error handling and security. The verb component identifies the operation to be performed on the payload of the sales order EBM such as create, update, delete, cancel, and query. Content-specific sales order EBO definitions can be created by assembling a set of common components and sales order EBO-specific business components. These context-specific EBM definitions can be used in corresponding content-specific EBMs. Thus, for a sales order EBO, there can be two schema modules, one containing the definition of the sales order EBO, and another containing the definition of the context-specific definitions for the sales order EBO.

As previously described, the distributed order orchestration system can receive a sales order from an order capture system, where the sales order can be a highly structured extensible markup language ("XML") document. The sales order can be converted into a source order, where the source order can be stored using an XML type. Using an XML type as a persistent storage for the source order allows structured query language ("SQL") queries on part of or the entire XML document. The source order can then be stored in either a structured storage or a binary XML storage. A structured storage, also known as a schema-based storage, uses an object-relational model to store one or more XML documents within a database. Binary XML storage allows for intermixed data and metadata. The distributed order orchestration system can use XML-specific SQL functions to query and update content within one or more XML documents. The distributed order orchestration system can also utilize one or more view objects associated with the source order, where the one or more view objects can be exposed through a service data object.

In decomposition enterprise business flow layer 330, an enterprise business flow invoked by a connector service is processed. The enterprise business flow can include one or more of the following steps, validate 304, receive 305, transform 306, and assign and launch orchestration process 307. Validate 304 validates the source order object. Receive 305 receives the source order object. Transform 306 transforms the source order object into a fulfillment order object, as is described below in greater detail. Assign and launch orchestration process 307 assigns the fulfillment order object to an orchestration process (such as orchestration process 309) and initiates the orchestration process.

Figure 4:
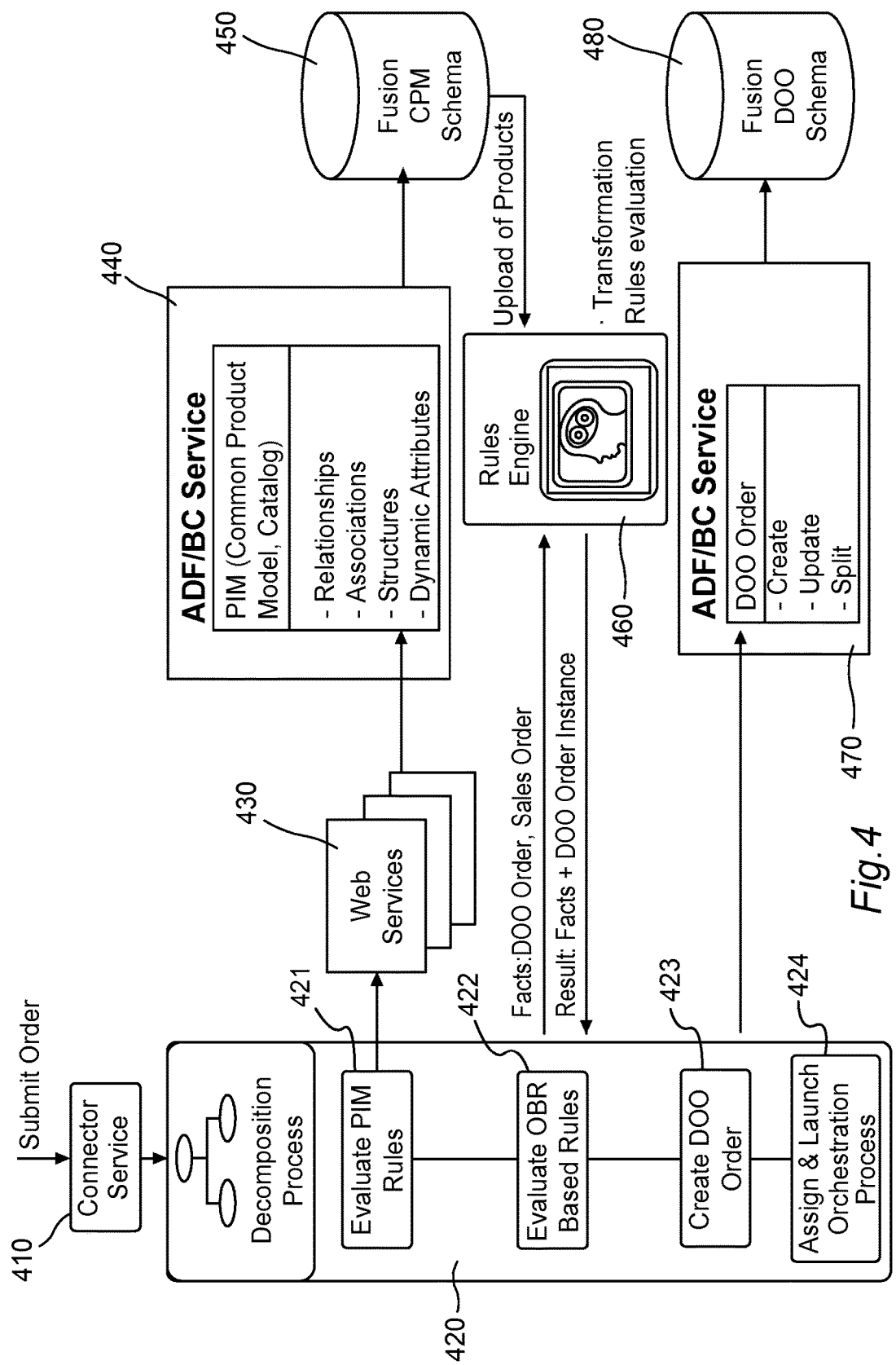
FIG. 4 illustrates an architectural flow diagram that depicts an interaction between components of a decomposition layer of a distributed order orchestration system, according to an embodiment of the invention.

FIG. 4 illustrates an architectural flow diagram that depicts an interaction between components of a decomposition layer of a distributed order orchestration system, according to an embodiment of the invention. According to an embodiment, a sales order is submitted. The sales order is captured by an order capture system (not illustrated in FIG. 4), and the order capture system invokes an order capture connector service 410. As previously described, order capture connector service 410 structurally transfers a structure of a sales order object that represents the sales order into a canonical object that the distributed order orchestration system can operate on (i.e., a sales order EBO).

According to the embodiment, order capture connector service 410 invokes a decomposition process 420. As previously described, decomposition process 420 transforms the received sales order into a fulfillment order (identified in FIG. 4 as a "DOO order"). As also previously described, this transformation transforms a sales-centric view of the order (i.e., sales order) into a fulfillment-centric view of the order (i.e., fulfillment order). As also previously described, this transformation transforms a representation of a product associated with the sales order into a representation of the product associated with the fulfillment order based on one or more product transformation rules.

According to the embodiment, there can be a plurality of transformation types, and they can be categorized into the following categories to perform the transformation of a sales-centric view of the order (i.e., sales order) into a fulfillment-centric view of the order (i.e., fulfillment order):

(a) product-to-product transformation; (b) attribute-to-attribute transformation; (c) context-to-attribute transformation; (d) context-to-product transformation; (e) attribute-to-product transformation; and (f) product-to-attribute transformation. The categories of transformation types are described below in greater detail.

In one embodiment, each of the above-identified transformation types can be implemented using product information management ("PIM"), which can include a common product model, a product data hub, and product and catalog management applications. PIM is described below in greater detail. In another embodiment, each of the above-identified types can be implemented using business rules. Business rules are also described below in greater detail.

According to the illustrated embodiment, at 421, one or more product transformation rules that are implemented using PIM (i.e., PIM rules, as illustrated in FIG. 4), are applied. More specifically, decomposition process 420 can invoke one or more web services 430, where each web service of the one or more web services 430 can invoke an application development framework ("ADF") business components ("BC") service 440 or view object. By invoking the ADF BC service, decomposition process can access a PIM entity, where the PIM entity can include a common product model, a product catalog, or a combination therein. The PIM entity can include PIM product relationships/associations, which can be used to relate/associate a product to one or more product entities stored within the PIM entity. Such relationships/associates can include related products, customer product cross-references, and source system products. In certain embodiments, the PIM entity can be stored in, and retrieved from common product model ("CPM") schema 450.

Related products can be used to define relationships between a sales-centric representation of a product and a fulfillment-centric representation of a product. According to the embodiment, when an order capture system captures a sales order, decomposition process 420 can transform the one or more products associated with the sales order, by calling a PIM service associated with the PIM entity for product relationships, where the product is associated with a relationship type of "Fulfillment" and the PIM service can return a corresponding product. Using the relationship type of "Fulfillment," it is possible to setup relationships between a sales product and multiple fulfillment products where one sales product decomposes to multiple fulfillment products. This type of relationship can be used for simple and one-level hierarchical relationships between products, and where there is no nested hierarchy. In such a scenario, the PIM service can return the multiple fulfillment products to decomposition process 420, and decomposition process 420 can add the multiple fulfillment products to the sales order by replacing the sales product with the multiple fulfillment products. Thus, a representation of a sales product can be transformed into a representation of a fulfillment product. This can be part of the transformation of the sales order to a fulfillment order.

Customer product cross-references can be used to define cross references between inventory products and customer products based on a customer product number. When a sales order is captured by an order capture system, the sales order can be captured based on the customer product number, and the customer product number can be what the order capture system associated with the sales order. Decomposition process 420 can invoke a PIM service associated with the PIM entity when given a customer product, and can provide an internal product associated with the customer product based on the customer product number.

Source system products can also be cross-referenced to products in a common product model. This type of relationship can be used when products are brought from disparate systems into a master product information repository. The cross-reference can be setup between a source system product and an item in the master product information repository, which is part of the common product model. When an order capture system captures an order, and when the order capture uses a different product from the products indicated in the master product information repository, this relationship type can be used to cross-reference products. According to an embodiment, decomposition process 420 can lookup the PIM entity where given a product and source system, and the PIM entity can provide an associated product from the common product model. This relationship type can be used during value/content transformations.

The following is a list of services that can be provided by a PIM entity, and which decomposition process 420 can use to transform a sales-centric view of an order (i.e., sales order) into a fulfillment-centric view of an order (i.e., fulfillment order):

| PIM Service | PIM Service Request | DOO Usage |
| --- | --- | --- |
| Product Relationships/ Associations | Given relationship type and product, provide list of related products | For transforming a sales product to a fulfillment product, decomposition process looks up a "Fulfillment" relationship |
| Customer Product Cross-References | Given customer product, provide the internal product | DOO can look into cross-references for customer products to derive the internal products |
| Source System Product Relationships | For a given product, provide source system product and vice-versa | DOO can use this to cross-reference products across systems |
| Structure Explosion | Provide a structure for a given product | DOO can call this service to explode given product into associated structure |
| Common Product Model/ Operational Attributes | Given a product, provide operational attributes | Common product model holds the definition of the products; DOO can look up the operational attributes for processing and validation |
| Transaction Item Attributes | Given a product, provide transaction item attributes | DOO can call this to lookup transaction item attributes for a product |

According to an embodiment, a transaction item attribute is an attribute whose value is specified or changed during a downstream business process and/or transaction (i.e., post-product definition), as part of the creation or updating of a product occurrence. A transaction item attribute can include metadata that comprises an internal name, a display name, and a description. In alternate embodiments, the transaction item attribute can also include one or more of the following metadata: a sequence (an order in which the attribute will appear), a tip (text that appears when user enters the attribute), a data type (such as Char, Number, Standard Date, Standard Date and Time), a column, a start date, an end date, a required flag (indicating whether the attribute is required), a "display as" indicator (indicating how the attribute is to be displayed), a hidden indicator (indicating whether the attribute is hidden), a read only indicator (indicating whether the attribute can be edited), a value set name, a default value, or a unit of measure class. A transaction item attribute can be stored in a child entity associated with the fulfillment order object within the distributed order orchestration system.

According to the illustrated embodiment, at 422, one or more product transformation rules that are implemented using business rules (i.e., OBR-based rules, as illustrated in FIG. 4), are applied. More specifically, decomposition process 420 can receive a sales order that includes one or more facts and a fulfillment order (i.e., DOO order) to a rules engine 460 that contains one or more product transformation rules (i.e., business rules). In certain embodiments, rules engine 460 also includes one or more products that are uploaded from common product model schema 450. The one or more product transformation rules are applied to the fulfillment order that includes one or more facts, and rules engine 440 transmits an instance of the fulfillment order (i.e., DOO order) that includes one or more facts to decomposition process 420. Facts are described below in greater detail. According to the embodiment, users of the distributed order orchestration system, such as business analysts, can change the one or more product transformation rules (i.e., business rules) without any underlying changes to the decomposition process. Thus, the process of changing transformation rules can be simplified because product transformation rules allow business analysis to easily change product transformation rules without any alteration to code.

According to an embodiment, in product transformation rules, a data model specifies the types of facts or business objects that are used to create product transformation rules. A fact is an object that a rule reasons on, and a fact is an asserted instance of an object class. Examples of facts are XML schema objects, Java classes, rule language ("RL") definitions, and ADF business component view objects. Decomposition process 420 can assert a fulfillment order (i.e., DOO order) to rules engine 440 as facts. Any of the elements from the fulfillment order can be used to construct product transformation rules.

In certain embodiments, decomposition process 420 can use XML fact type definitions, and decomposition process 420 can operate on the underlying XML before the order is persisted in a database. The XML fact type allows selected attributes and sub-elements of an XML element or complex type to be declared to rules engine 440 so that instances of the XML fact type can be accessed, created, modified, and deleted by rules.

In rules engine 440, facts that can be run against the product transformation rules are data objects that have been asserted. Each object instance corresponds to a single fact. If an object is re-asserted (whether it has been changed or not), rules engine 440 can be updated to reflect a new state of the object. Re-asserting the object does not create a new fact. In order to have multiple facts of a particular fact type, separate object instances must be asserted.

A rules engine decision service that is associated with rules engine 440 can support both stateful and stateless interactions. A stateful interaction maintains all instances of objects asserted throughout the session. A stateless pattern assumes that all facts are asserted as one unit.

Decomposition process 420 can leverage a capability of inferencing in rules engine 440 whenever there are dependencies across different transformation rule types and transformation rules. When one rule can cause another rule to be initiated, rules engine 440 can automatically initiate the second transformation rule when the first rule changes a fact in such a way that it satisfies the conditions of the second rule. When a new fact is created, rules engine 440 can take care of adding the related rules to a set of rules to be initiated, and by that, can automatically handle rule inference.

Rule engine 440 can include one or more rule sets, where each rule set can include one or more product transformation rules. In certain embodiments, a rule set can contain rules whose evaluations are related to producing the result(s) of the rule set. In other words, a rule set can contain rules focused on accomplishing an identical or similar goal. For example, rule sets may be organized such that a first rule set evaluates product-to-product transformations, a second rule set evaluates product-to-attribute transformations, and a third rule set evaluates attribute-to-product transformations.

In certain embodiments, one or more product transformation rules can utilize one or more RL functions. This way, the one or more product transformation rules can share same or similar expressions by utilizing the RL functions.

In certain embodiments, one or more product transformation rules are stored in a decision table. Product transformation rules in a decision table can be organized as a table that contains a tree of condition cells and action cells. A decision table can have an if-then structure, where the if part represents a condition or pattern match, and the then part represents a list of actions. The if part of a rule is composed of conditional expressions, or rule conditions, that refer to facts. The then part of the rule contains the actions that are executed when the rule is executed.

The conditions area in a decision table can include a set of condition expressions. As previously described, a condition expression can apply to a fact, where a fact is an XML fact. A bucket set can be associated with every condition expression. A bucket set can be a local bucket set or a global bucket set. The value for a given condition cell can take its value from one or more buckets in an associated bucket set.

At run time, whenever facts match the condition cells, the actions associated with the rule are executed. Whenever there is more than one action, the actions can be ordered, where actions appearing in earlier rows can run before actions in subsequent rows. Types of actions include assert, assert new, assign, assign new, modify, retract, and call.

A decision table can use bucket sets to define a group of values or ranges of values in the condition expressions that are part of the decision table. The bucket set values can determine for each condition expression in a decision table, that it has two or more possibilities. Using a bucket set, each possibility in a condition expression is divided into two groups where a cell specified one bucket of values from the bucket set.

Product transformation rules can be organized where rules for each transformation type are defined in different decision tables. Also, depending on the number of conditional expressions and choice of values for each of the conditional expressions for which the rules are being defined, the rules can be organized across different decision tables even within a given transformation type. The inference capability of the rules can automatically handle any dependencies between the rules.

According to the illustrated embodiment, at 423, a fulfillment order (i.e., DOO order) is created by invoking an ADF BC service. At 424, the fulfillment order is assigned to an orchestration process, and the orchestration process is executed.

Figure 5:
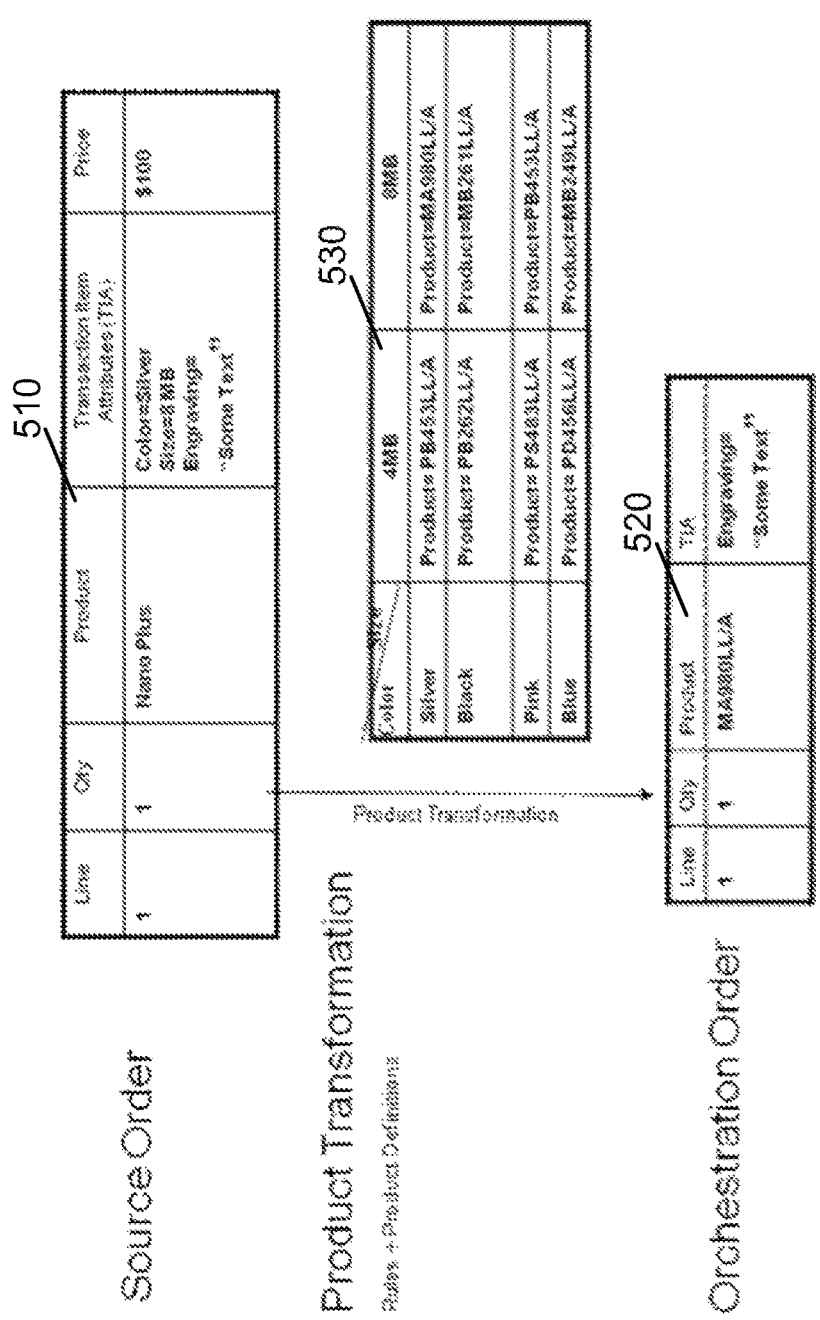
FIG. 5 illustrates an example attribute-to-product transformation, according to an embodiment of the invention.

FIG. 5 illustrates an example attribute-to-product transformation, according to an embodiment of the invention. According to the embodiment, a sales order (identified in FIG. 5 as source order 510) includes a first representation of a product. In certain embodiments, the first representation of the product can include a product identity, one or more transaction item attributes, one or more context attributes, or a combination therein. More specifically, source order 510 includes a product identity "Nano Plus," and includes the following set of transaction item attributes: color (with a value of "Silver"); size (with a value of "8 MB"); and engraving (with a value of "Some Text"). Thus, within source order 510, a product is captured, based on a product identity, where additional information about the product is captured in the transaction item attributes.

According to the embodiment, using the information captured within source order 510, source order 510 is transformed into a fulfillment order (identified in FIG. 5 as orchestration order 520) using product transformation table 530. More specifically, using the transaction item attributes included within source order 510, the first representation of the product included within source order 510 can be transformed to a second representation of the product that can be included within orchestration order 520. In certain embodiments, the second representation of the product can include a product identity, one or more transaction item attributes, one or more context attributes, or a combination therein. This transformation can be implemented by transforming the transaction item attributes included within source order 510 into a product identity included within orchestration order 520 using a product identity included within product transformation table 530. Thus, a first representation of the product included within source order 510 can be transformed into a second representation of the product included within orchestration order 520.

In certain embodiments, in orchestration order 520, the transaction item attributes included within source order 510 are replaced with the product identity included within product transformation table 530. However, in alternate embodiments, the transaction item attributes included within source order 510 are not replaced, and instead, are also included within orchestration order 520. In these embodiments, the product identity included within product transformation table 530 can also be included within orchestration order 520, in addition to the transaction item attributes. In some of these embodiments, the product identity included within product transformation table 530 can also be included within orchestration order 520 as one or more additional order lines.

In the specific example illustrated in FIG. 5, product transformation table 530 includes a cross-map of one or more product definitions. One or more product transformation rules utilize the cross-map to transform the first representation of the product included within source order 510 to the second representation of the product included within orchestration order 520. More specifically, one or more product transformation rules identify the color and size transaction item attributes included within source order 510 and map the respective values (i.e., "Silver" and "8 MB") to a product identity "MA980LL/A" included within product transformation table 530, using the cross-map. The product identity "MA980LL/A" is then stored within orchestration order 520, replacing the color and size transaction item attributes that were stored within source order 510.

Figure 6:
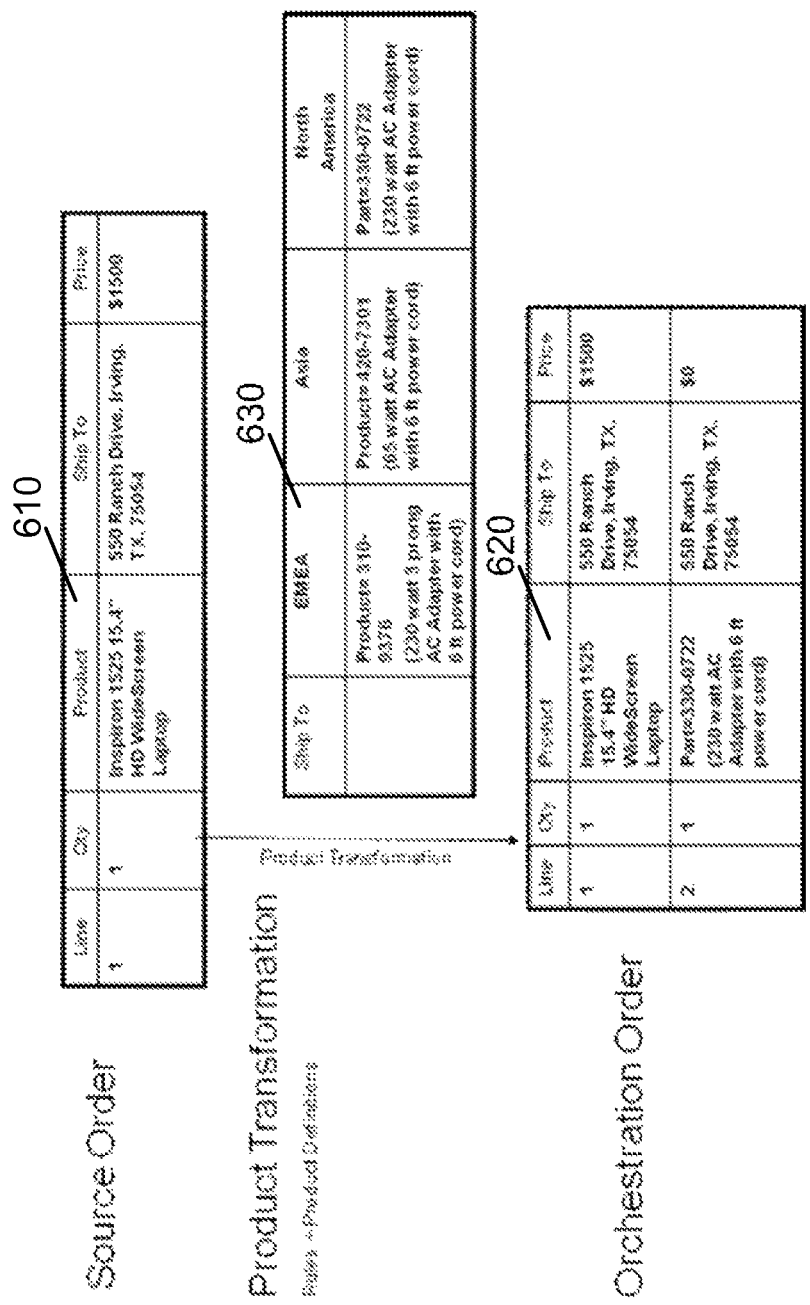
FIG. 6 illustrates an example context-to-product transformation, according to an embodiment of the invention.

FIG. 6 illustrates an example context-to-product transformation, according to an embodiment of the invention. According to the embodiment, a sales order (identified in FIG. 6 as source order 610) includes a first representation of a product. In certain embodiments, the first representation of the product can include a product identity, one or more transaction item attributes, one or more context attributes, or a combination therein. More specifically, source order 610 includes a product identity, and also includes a context.

Context refers to one or more attributes included on an order that are not product-related attributes (i.e., one or more attributes that are context attributes). In the previous embodiment illustrated in FIG. 5, the set of transaction item attributes were product-related attributes, because each transaction item attribute includes information related to the product. More specifically, in the previous embodiment illustrated in FIG. 5, the color attribute included information regarding a color of the "Nano Plus" product, the size attribute included information regarding a size of the "Nano Plus" product, and the engraving attribute included information regarding text that is engraved on the "Nano Plus" product. In contrast, in the embodiment illustrated in FIG. 6, one or more context attributes can be included on an order, where the one or more context attributes are not related to a product. These one or more context attributes comprise a context of an order. More specifically, in the illustrated embodiment of FIG. 6, source order 610 includes a product identity "Inspirion 1525 15.4" HD WideScreen Laptop," and also includes a "Ship To" attribute with a value of "550 Ranch Drive, Irving, Tex., 75074." Thus, within source order 610, a product is captured, based on a product identity, and a context is captured, where the context is captured in one or more context attributes.

According to the embodiment, using the information captured within source order 610, source order 610 is transformed into a fulfillment order (identified in FIG. 6 as orchestration order 620) using product transformation table 630. More specifically, using the context (i.e., the one or more context attributes) included within source order 610, the first representation of the product included within source order 610 can be transformed to a second representation of the product that can be included within orchestration order 620. In certain embodiments, the second representation of the product can include a product identity, one or more transaction item attributes, one or more context attributes, or a combination therein. This transformation can be implemented by transforming the context (i.e., the one or more context attributes) included within source order 610 into a product identity included within orchestration order 620 using a product identity included within product transformation table 630. Thus, a first representation of the product included within source order 610 can be transformed into a second representation of the product included within orchestration order 620.

In certain embodiments, in orchestration order 620, an order line is added to orchestration order 620, where the order line includes the product identity included within product transformation table 630. However, in alternate embodiments, the context (i.e., the one or more context attributes) included within source order 610 is used to include the product per the product transformation table. In some of these embodiments, the product identity is included within an existing order line included within orchestration order 620.

In the specific example illustrated in FIG. 6, product transformation table 630 includes a cross-map of one or more product definitions. One or more product transformation rules utilize the cross-map to transform the first representation of the product included within source order 610 to the second representation of the product included within orchestration order 620. More specifically, one or more product transformation rules identify the "Ship To" attribute included within source order 610 and map the value "550 Ranch Drive, Irving, Tex., 75054" to a product identity "330-9722" included within product transformation table

630 that represents a 230 watt AC Adapter with a 6-foot power cord, using the cross-map. The value "550 Ranch Drive, Irving, Tex., 75054" is mapped to the product identity "330-9722" based on the fact that the value represents an address in North America, as opposed to EMEA or Asia. The product identity "330-9722" is then stored within orchestration order 620, as a separate order line.

Figure 7:
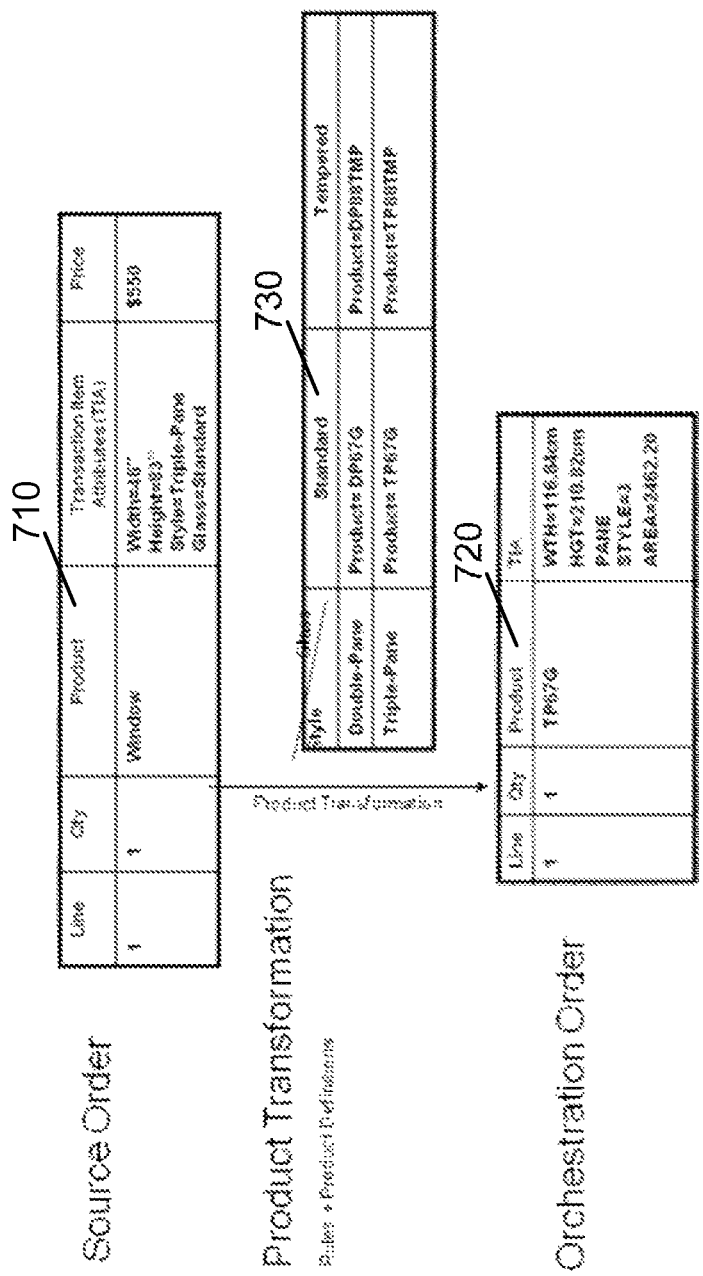
FIG. 7 illustrates an example product-to-attribute transformation, according to an embodiment of the invention.

FIG. 7 illustrates an example product-to-attribute transformation, according to an embodiment of the invention. According to the embodiment, a sales order (identified in FIG. 7 as source order 710) includes a first representation of a product, where source order 710 also includes a set of transaction item attributes that can be used to derive a product that is required for the fulfillment process. In certain embodiments, the first representation of the product can include a product identity, one or more transaction item attributes, one or more context attributes, or a combination therein. More specifically, source order 710 includes a product identity "Window," and further includes the following set of transaction item attributes: width (with a value of "46""); height (with a value of "83""); style (with a value of "Triple-Pane"), and glass (with a value of "Standard"). Thus, within source order 710, a product is captured based on a product identity, where additional information about the product is captured in the transaction item attributes.

According to the embodiment, using the information captured within source order 710, source order 710 is transformed into a fulfillment order (identified in FIG. 7 as orchestration order 720) using product transformation table 730. More specifically, using the product identity and the transaction item attributes included within source order 710, the first representation of the product included within source order 710 can be transformed to a second representation of the product that can be included within orchestration order 720. In certain embodiments, the second representation of the product can include a product identity, one or more transaction item attributes, one or more context attributes, or a combination therein. This transformation can be implemented by adding one or more transaction item attributes to the product that is included within orchestration order 720 based on the product identity that is included within source order 710 using a product identity included within product transformation table 730. Thus, a first representation of the product included within source order 710 can be transformed into a second representation of the product included within orchestration order 720.

In the specific example illustrated in FIG. 7, product transformation table 730 includes a cross-map of one or more product definitions. One or more product transformation rules utilize the cross-map to transform the first representation of the product included within source order 710 to the second representation of the product included within orchestration order 720. More specifically, one or more product transformation rules identify the style and glass transaction item attributes included within source order 710 (and associated with the product identity included within source order 710) and map the respective values (i.e., "Triple-Pane" and "Standard") to a product identity "TP67G" included within product transformation table 730, using the cross-map. The product identity "TP67G" is then stored within orchestration order 720. In addition, it is determined, based on the value "Standard" of the glass transaction item attribute, that orchestration order 720 includes the following transaction item attributes: width, height, style, and area, where area is a transaction item attribute not included within source order 710. According to the illustrated embodiment, the width and height transaction item attributes included within source order 710 are converted from inches to centimeters, and included within orchestration order 720. Furthermore, an area transaction item attribute is computed based on the width and height transaction item attributes included within orchestration 720, and the area transaction item attribute is also included within orchestration order 720. Thus, a new transaction item attribute is created based on the product identity and transaction item attributes included within source order 710, and the new transaction item attribute is included within orchestration order 720.

Figure 8:
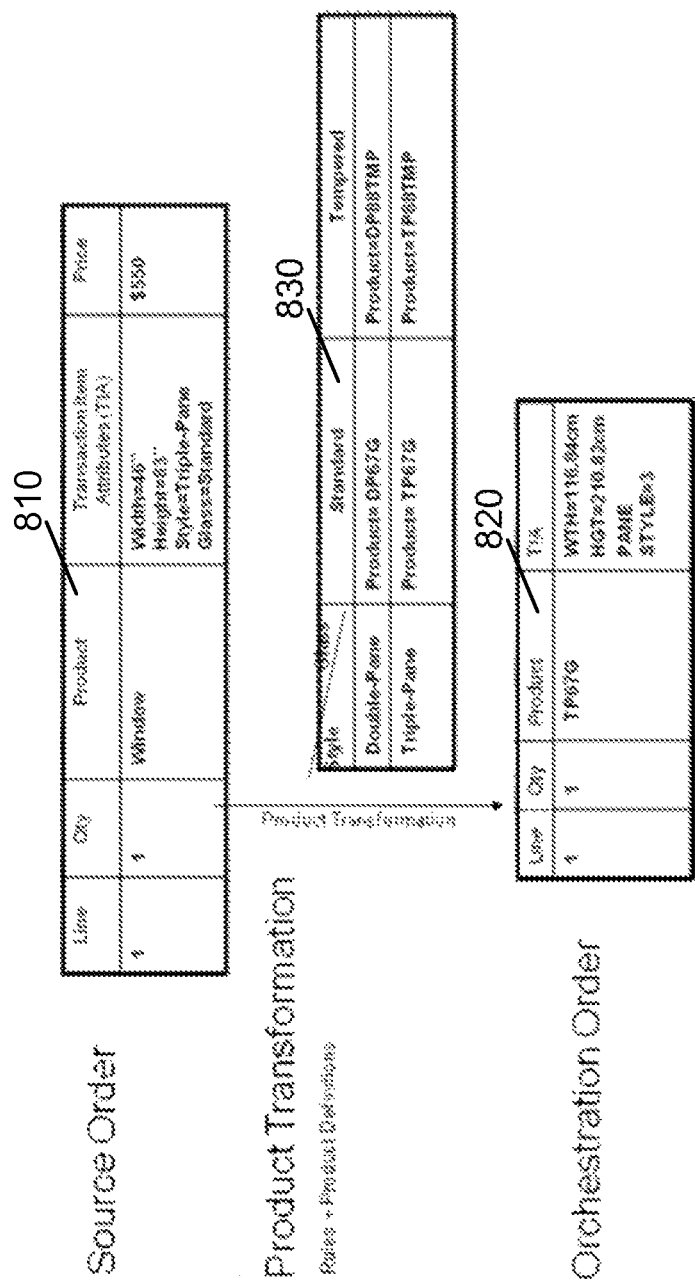
FIG. 8 illustrates an example attribute-to-attribute transformation, according to an embodiment of the invention.

FIG. 8 illustrates an example attribute-to-attribute transformation, according to an embodiment of the invention. According to the embodiment, similar to the embodiment illustrated in FIG. 7, a sales order (identified in FIG. 8 as source order 810) includes a first representation of a product. In certain embodiments, the first representation of the product can include a product identity, one or more transaction item attributes, one or more context attributes, or a combination therein. More specifically, source order 810 includes a product identity "Window," and further includes the following set of transaction item attributes: width (with a value of "46""); height (with a value of "83""); style (with a value of "Triple-Pane"), and glass (with a value of "Standard"). Thus, within source order 810, a product is captured, based on a product identity, where additional information about the product is captured in the transaction item attributes.

According to the embodiment, using the information captured within source order 810, source order 810 is transformed into a fulfillment order (identified in FIG. 8 as orchestration order 820) using product transformation table 830. More specifically, using the transaction item attributes included within source order 810, the first representation of the product included within source order 810 can be transformed to a second representation of the product that can be included within orchestration order 820. In certain embodiments, the second representation of the product can include a product identity, one or more transaction item attributes, one or more context attributes, or a combination therein. This transformation can be implemented by transforming one or more transaction item attributes of the product that is included within source order 810 into one or more transaction item attributes of the product that is included within orchestration 820 using a product included within product transformation table 830. Thus, a first representation of the product included within source order 810 can be transformed into a second representation of the product included within orchestration order 820.

In the specific example illustrated in FIG. 8, product transformation table 830 includes a cross-map of one or more product definitions. One or more product transformation rules utilize the cross-map to transform the first representation of the product included within source order 810 to the second representation of the product included within orchestration order 820. More specifically, one or more product transformation rules identify the style and glass transaction item attributes included within source order 810 and map the respective values (i.e., "Triple-Pane" and "Standard") to a product identity "TP67G" included within product transformation table 830, using the cross-map. The product identity "TP67G" is then stored within orchestration order 820. In addition, it is determined, based on the value "Standard" of the glass transaction item attribute, that orchestration order 820 includes the following transaction item attributes: width, height, and style. According to the illustrated embodiment, the width and height transaction item attributes included within source order 810 are converted from inches to centimeters, and included within orchestration order 820. Thus, source order 810 and orchestration order 820 can handle the width and height transaction item attributes using different metrics.

Figure 9:
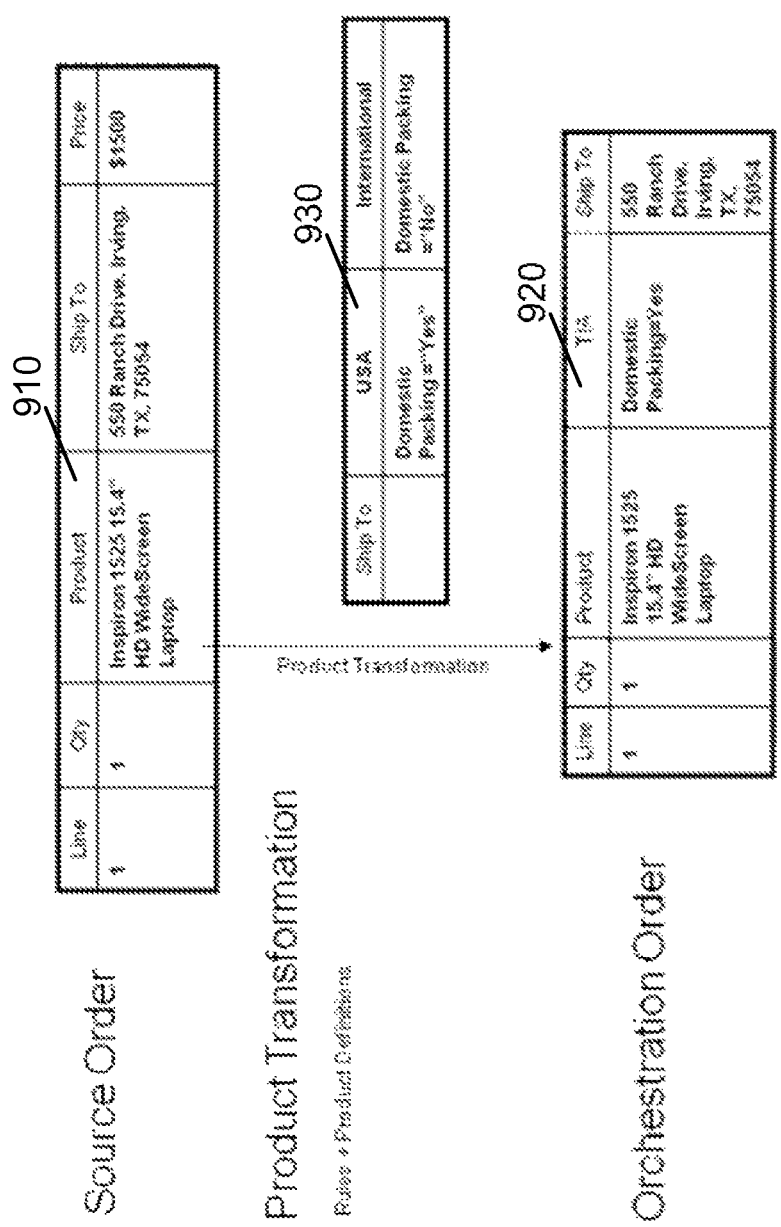
FIG. 9 illustrates an example context-to-attribute transformation, according to an embodiment of the invention.

FIG. 9 illustrates an example context-to-attribute transformation, according to an embodiment of the invention. According to the embodiment, a sales order (identified in FIG. 9 as source order 910) According to the embodiment, a sales order (identified in FIG. 9 as source order 910) includes a first representation of a product. In certain embodiments, the first representation of the product can include a product identity, one or more transaction item attributes, one or more context attributes, or a combination therein. More specifically, source order 910 includes a product identity, and also includes a context. Context, as previously described, refers to one or more attributes included on an order that are not product-related attributes (i.e., one or more attributes that are context attributes). In the embodiment illustrated in FIG. 9, one or more context attributes can be included on an order, where the one or more context attributes are not related to a product. These one or more context attributes comprise a context of an order. More specifically, in the illustrated embodiment of FIG. 9, source order 910 includes a product identity "Inspirion 1525 15.4" HD WideScreen Laptop," and also includes a "Ship To" attribute with a value of "550 Ranch Drive, Irving, Tex., 75074." Thus, within source order 910, a product is captured, based on a product identity, and a context is captured, where the context is captured in one or more context attributes.

According to the embodiment, using the information captured within source order 910, source order 910 is transformed into a fulfillment order (identified in FIG. 9 as orchestration order 920) using product transformation table 930. More specifically, using the context (i.e., the one or more context attributes) included within source order 910, the first representation of the product included within source order 910 can be transformed to a second representation of the product that can be included within orchestration order 920. In certain embodiments, the second representation of the product can include a product identity, one or more transaction item attributes, one or more context attributes, or a combination therein. This transformation can be implemented by transforming the context (i.e., the one or more context attributes) included within source order 910 into one or more transaction item attributes included within orchestration order 920 using a product identity included within product transformation table 930. Thus, a first representation of the product included within source order 910 can be transformed into a second representation of the product included within orchestration order 920.

In certain embodiments, in orchestration order 920, the one or more transaction item attributes are added to orchestration order 920. However, in alternate embodiments, the context (i.e., the one or more context attributes) included within source order 910 is used for determining one or more transaction attributes.

In the specific example illustrated in FIG. 9, product transformation table 930 includes a cross-map of one or more product definitions. One or more product transformation rules utilize the cross-map to transform the first representation of the product included within source order 910 to the second representation of the product included within orchestration order 920. More specifically, one or more product transformation rules identify the "Ship To" attribute included within source order 910 and map the value "550 Ranch Drive, Irving, Tex., 75054" to a "Domestic Packing" transaction item attribute, with a value of "Yes," using the cross-map. The value "550 Ranch Drive, Irving, Tex., 75054" is mapped to the "Domestic Packing" transaction item attribute with a value of "Yes" based on the fact that the value represents an address in North America/USA. The "Domestic Packing" transaction item attribute is then stored within orchestration order 920.

Figure 10:
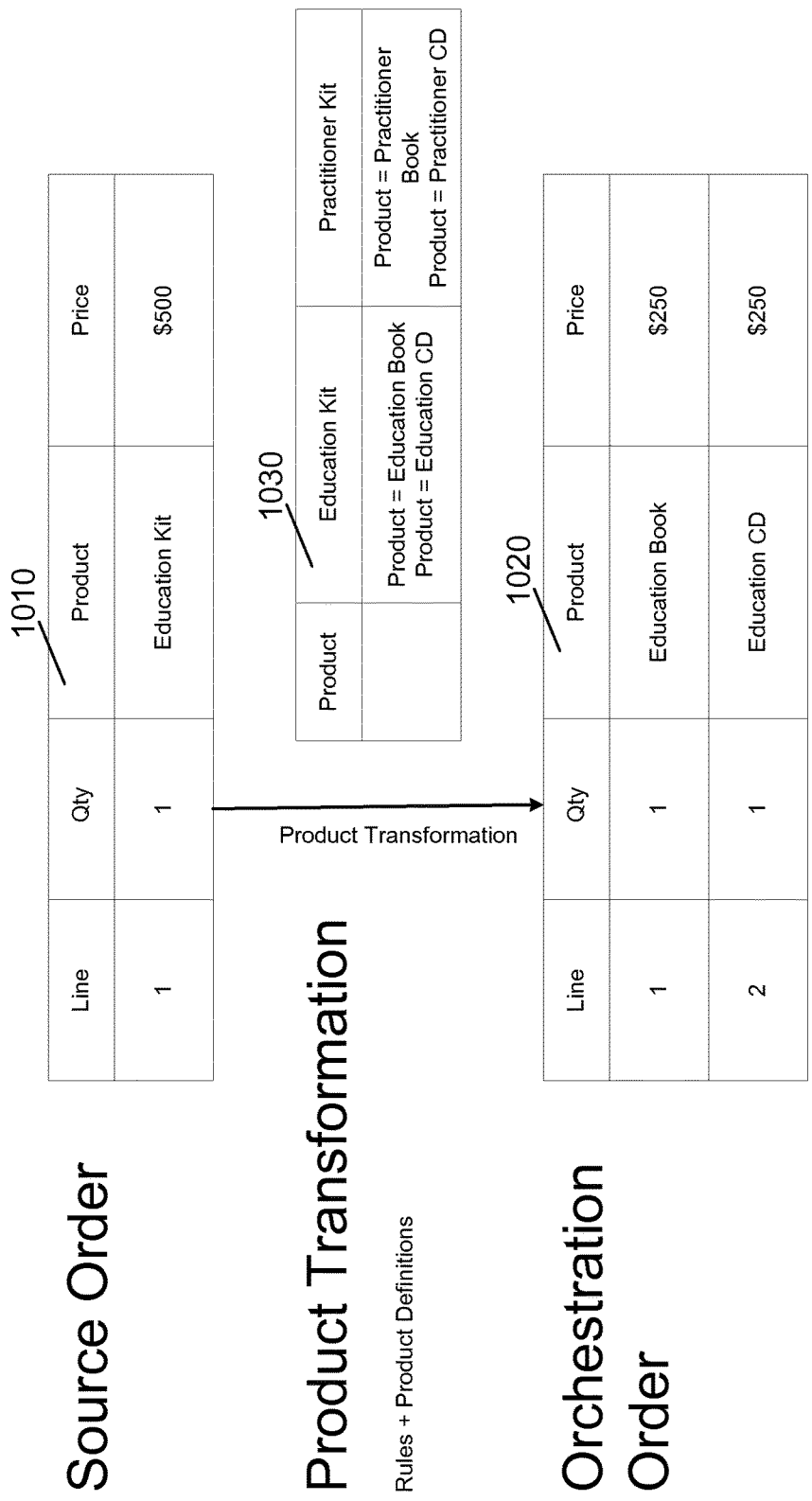
FIG. 10 illustrates an example product-to-product transformation, according to an embodiment of the invention.

FIG. 10 illustrates an example product-to-product transformation, according to an embodiment of the invention. According to the embodiment, a sales order (identified in FIG. 10 as source order 1010) includes a first representation of a product. In certain embodiments, the first representation of the product can include a product identity, one or more transaction item attributes, one or more context attributes, or a combination therein. More specifically, source order 1010 includes a product identity "Education Kit." Thus, within source order 1010, a product is captured, based on a product identity.

According to the embodiment, using the information captured within source order 1010, source order 1010 is transformed into a fulfillment order (identified in FIG. 10 as orchestration order 1020) using product transformation table 1030. More specifically, using the product identity included within source order 1010 the first representation of the product included within source order 1010 can be transformed to a second representation of the product that can be included within orchestration order 1020. In certain embodiments, the second representation of the product can include a product identity, one or more transaction item attributes, one or more context attributes, or a combination therein. This transformation can be implemented by replacing the product identity that is included within source order 1010 with one or more product identities that are included within orchestration order 1020, using one or more product identities included within product transformation table 1030. Thus, a first representation of the product included within source order 1010 can be transformed into a second representation of the product included within orchestration order 1020.

In the specific example illustrated in FIG. 10, product transformation table 1030 includes a cross-map of one or more product definitions. One or more product transformation rules utilize the cross-map to transform the first representation of the product included within source order 1010 to a second representation of the product included within orchestration order 1020. More specifically, one or more product transformation rules identify the product identity "Education Kit" included within source order 1010 and map the product identity to a set of two products (i.e., product identities "Education Book" and "Education CD") included within product transformation table 1030, using the cross-map. The product identities "Education Book" and "Education CD" are then stored within orchestration order 1020, replacing the product identity "Education Kit." Thus, one or more product identities are created based on the product identity included within source order 1010, and the one or more product identities are included within orchestration order 1020.

Figure 11:
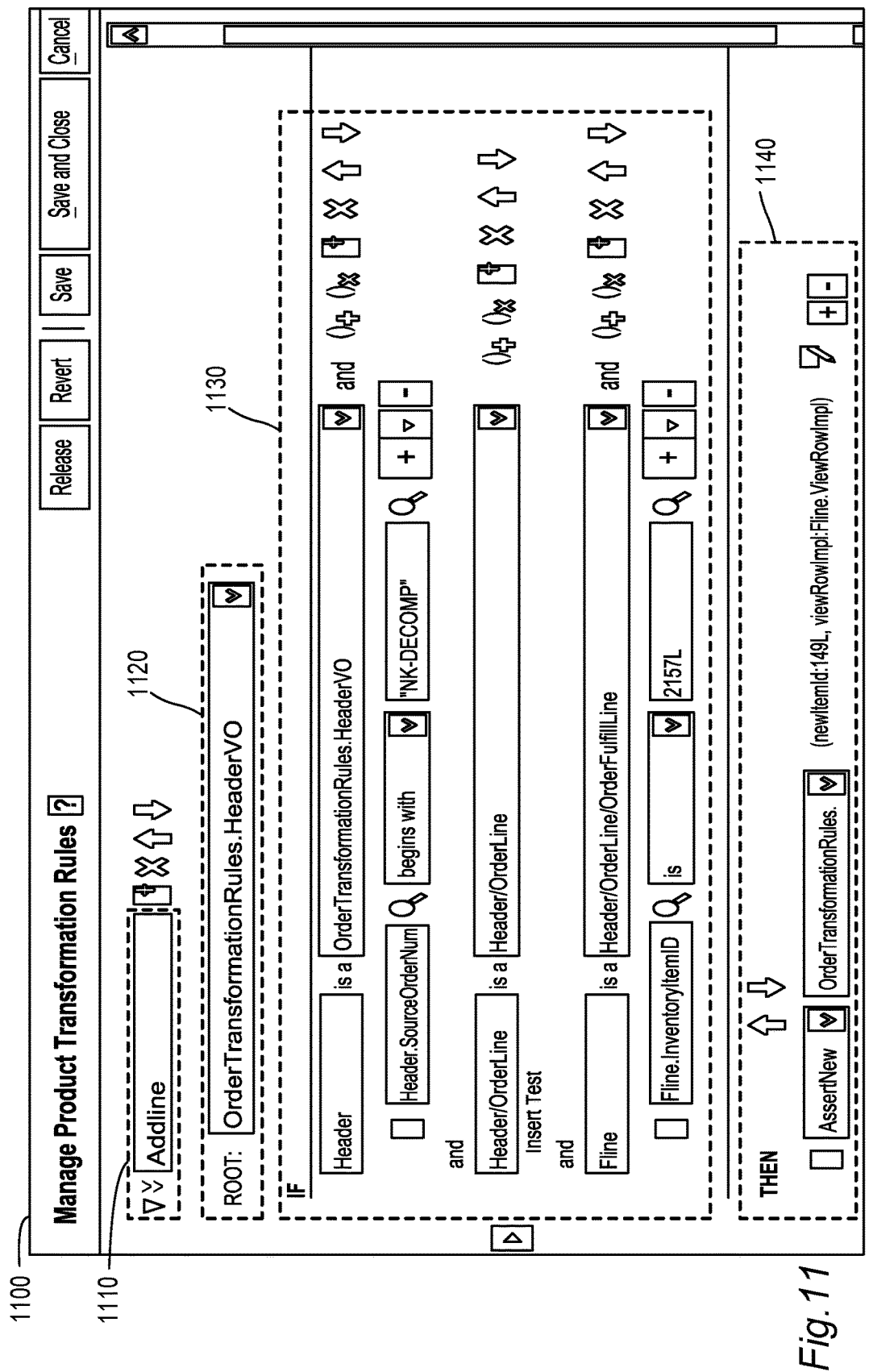
FIG. 11 illustrates an example user interface of a distributed order orchestration system for creating product transformation rules, according to an embodiment of the invention.

FIG. 11 illustrates an example user interface 1100 of a distributed order orchestration system for creating product transformation rules, according to an embodiment of the invention. According to the embodiment, the product transformation rules can be implemented in the form of business rules. While creating the product transformation rules, one or more attributes of an order object are available within user interface 1100. The one or more attributes can include a context (i.e., one or more context attributes), one or more transaction item attributes, or a combination therein. These one or more attributes can be used to determine the transformations.

According to the illustrated embodiment, user interface 1100 includes section 1110. Section 1110 can display the name of the product transformation rule that is being created. In the illustrated embodiment, the name of the product transformation rule is "AddLine( )" User interface also includes section 1120. Section 1120 can display a root, which is an object that the product transformation rule is applied to, such as an order object. In the illustrated embodiment, the root is "OrderTransformationRules.Header( )" User interface also includes section 1130. Section 1130 can display an "IF" clause that includes one or more attributes, and one or more comparison of attributes. User interface also includes section 1140. Section 1140 can display a "THEN" clause that includes one or more transformations. In the illustrated embodiment, section 1130 includes a comparison of an attribute on the "OrderTransformationRules.Header( )" object, and section 1140 includes a transformation that involves adding a product to the "OrderTransformationRules.Header( )" object.

Figure 12:
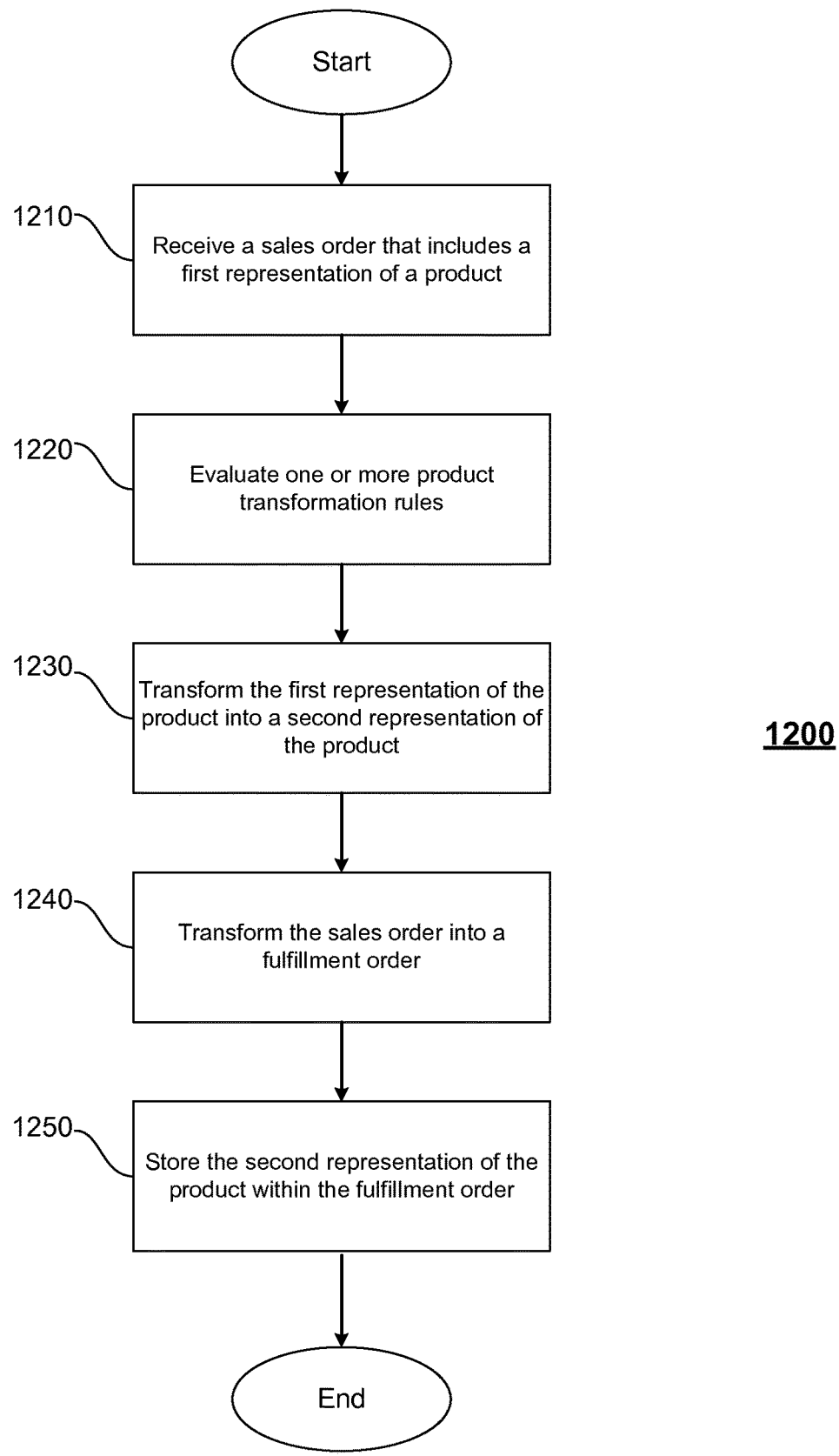
FIG. 12 illustrates a flow diagram of the functionality of a product transformation module according to an embodiment of the invention.

FIG. 12 illustrates a flow diagram 1200 of the functionality of a product transformation module according to an embodiment of the invention. In one embodiment, the functionality of flow diagram 1200 of FIG. 12 is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and then proceeds to 1210. At 1210, a sales order is received, where the sales order includes a first representation of a product. The sales order can be an order received from an order capture system, and can be in a first format used by the order capture system. In certain embodiments, the first representation of the product can include a product identity, one or more transaction item attributes, one or more context attributes, or a combination therein. The flow then proceeds to 1220. At 1220, one or more product transformation rules are evaluated. The flow then proceeds to 1230. At 1230, the first representation of the product is transformed into a second representation of the product based on the one or more product transformation rules. In certain embodiments, the second representation of the product can include a product identity, one or more transaction item attributes, one or more context attributes, or a combination therein. The flow then proceeds to 1240. At 1240, the sales order is transformed into a fulfillment order, where the fulfillment order can be in a second format used by a distributed order orchestration system. The first format used by the order capture system can be a different format than the second format used by the distributed order orchestration system. The flow then proceeds to 1250. At 1250, the second representation of the product is stored within the fulfillment order. The flow then ends.

According to certain embodiments, the transformation of the first representation of the product into the second representation of the product includes a transformation of one or more transaction item attributes into a product identity. In alternate embodiments, the transformation of the first representation of the product into the second representation of the product includes a transformation of one or more context attributes into a product identity. In other embodiments, the transformation of the first representation of the product into the second representation of the product includes a transformation of a product identity into one or more transaction item attributes. In alternate embodiments, the transformation of the first representation of the product into the second representation of the product includes a transformation of one or more transaction item attributes into one or more different transaction item attributes. In other embodiments, the transformation of the first representation of the product into the second representation of the product includes a transformation of one or more context attributes into one or more transaction item attributes. In alternate embodiments, the transformation of the first representation of the product into the second representation of the product includes a transformation of a product identity into one or more different product identities.

In certain embodiments, the one or more product transformation rules include a product information management entity, where the product information management entity includes one or more relationships between one or more products. In other embodiments, the one or more product transformation rules include one or more business rules, where each business rule of the one or more business rules includes business logic that controls operation of the business rule. In other embodiments, some of the one or more product transformation rules include a product information management entity, and some of the one or more product transformation rules include one or more business rules.

Thus, according to an embodiment, fulfillment-related product details that are required for fulfillment can be segregated from sales-related product details, thus simplifying the ordering process, and eliminating complexity that arises from having fulfillment-related product details present on the sales order. With the product transformation rules capabilities within the distributed order orchestration system, an order capture system can have a more customer-centric representation of the product, and the fulfillment systems can have a different representation of the product. A product and its attributes can be modeled from a perspective of what is required to be captured when entering the order, and can be enriched with fulfillment-related product details, or transformed into products that are required to fulfill the order. Therefore, embodiments of the invention can overcome disadvantages with conventional order management solutions, where sales products are modeled with details that are required during a fulfillment process. The product transformation rules can facilitate a clear delineation between a sales-centric view of an order and a fulfillment-centric view of an order.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to transform a sales order for a product into a fulfillment order within a distributed orchestration system, the transforming comprising:
   receiving the sales order, from an order capture system via a computer network, including a first representation of a product that includes a product identify, at least one transaction item attribute and at least one context attribute, the sales order having an extended markup language (XML) format;
   evaluating, by a rules engine, one or more product transformation rules stored in one or more decision tables against at least one of the product identity, the transaction item attribute or the context attribute of the first representation of the product to identify at least one of a new product identity or a new transaction item attribute;
   transforming the first representation of the product into a second representation of the product that includes the context attribute and at least one of the new product identity or the new transaction item attribute;
   transforming the sales order into the fulfillment order, including storing the second representation of the product within the fulfillment order;
   creating a task message for processing the fulfillment order based on the second representation of the product, the task message including a task to be performed and parameters for performing the task;
   transmitting the task message to a fulfillment system via the computer network; and
   receiving a result message from the fulfillment system via the computer network, the result message including data associated with processing the fulfillment order, the data including a date when a shipment is scheduled or a date when a good is shipped.

2. The non-transitory computer-readable medium of claim 1, wherein the one or more product transformation rules decompose a sales product into one or more fulfillment products.

3. The non-transitory computer-readable medium of claim 1, wherein the one or more product transformation rules comprise one or more rules and logic that controls operation of the one or more rules.

4. The non-transitory computer-readable medium of claim 1, wherein each decision table includes a tree of condition cells and action cells.

5. The non-transitory computer-readable medium of claim 1, wherein the fulfillment system includes an invoicing system, a scheduling system or a shipping system.

6. A computer-implemented method for transforming a sales order that comprises a product into a fulfillment order within a distributed order orchestration system, the computer-implemented method comprising:
   receiving the sales order, from an order capture system via a computer network, including a first representation of a product that includes a product identify, at least one transaction item attribute and at least one context attribute, the sales order having an extended markup language (XML) format;
   evaluating, by a rules engine, one or more product transformation rules stored in one or more decision tables against at least one of the product identity, the transaction item attribute or the context attribute of the first representation of the product to identify at least one of a new product identity or a new transaction item attribute;
   transforming the first representation of the product into a second representation of the product that includes the context attribute and at least one of the new product identity or the new transaction item attribute;
   transforming the sales order into the fulfillment order, including storing the second representation of the product within the fulfillment order;
   creating a task message for processing the fulfillment order based on the second representation of the product, the task message including a task to be performed and parameters for performing the task;
   transmitting the task message to a fulfillment system via the computer network; and
   receiving a result message from the fulfillment system via the computer network, the result message including data associated with processing the fulfillment order, the data including a date when a shipment is scheduled or a date when a good is shipped.

7. The method of claim 6, wherein the one or more product transformation rules comprise one or more relationships between one or more products.

8. The method of claim 6, wherein the one or more product transformation rules comprise one or more rules and logic that controls operation of the one or more rules.

9. The method of claim 6, wherein each decision table includes a tree of condition cells and action cells.

10. The method of claim 6, wherein the fulfillment system includes an invoicing system, a scheduling system or a shipping system.

11. A system, comprising:
   a memory storing a product transformation module;
   a processor, coupled to the memory, that, when executing the product transformation module, is configured to:
      receive a sales order, from an order capture system via a computer network, including a first representation of a product that includes a product identify, at least one transaction item attribute and at least one context attribute, the sales order having an extended markup language (XML) format;
      evaluate, by a rules engine, one or more product transformation rules stored in one or more decision tables against at least one of the product identity, the transaction item attribute or the context attribute of the first representation of the product to identify at least one of a new product identity or a new transaction item attribute;
      transform the first representation of the product into a second representation of the product that includes the context attribute and at least one of the new product identity or the new transaction item attribute;
      transform the sales order into a fulfillment order, including store the second representation of the product within the fulfillment order;
      create a task message for processing the fulfillment order based on the second representation of the product, the task message including a task to be performed and parameters for performing the task; and a communication device, coupled to the processor, configured to:

transmit the task message to a fulfillment system via the computer network, and receive a result message from the fulfillment system via the computer network, the result message including data associated with processing the fulfillment order, the data including a date when a shipment is scheduled or a date when a good is shipped.

12. The system of claim 11, wherein the one or more product transformation rules comprise one or more relationships between one or more products.

13. The system of claim 11, wherein the one or more product transformation rules comprise one or more rules and logic that controls operation of the one or more rules.

14. The system of claim 11, wherein each decision table includes a tree of condition cells and action cells.

15. The system of claim 11, wherein the fulfillment system includes an invoicing system, a scheduling system or a shipping system.

* * * * *